(12) United States Patent
Hwang et al.

(10) Patent No.: US 11,177,869 B2
(45) Date of Patent: Nov. 16, 2021

(54) METHOD FOR PERFORMING MEASUREMENT, USER EQUIPMENT AND BASE STATION

(71) Applicant: LG Electronics Inc., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/036,371

(22) Filed: Sep. 29, 2020

(65) Prior Publication Data
US 2021/0028852 A1    Jan. 28, 2021

Related U.S. Application Data

(63) Continuation of application No. PCT/KR2019/003785, filed on Apr. 1, 2019.

(30) Foreign Application Priority Data

| Apr. 4, 2018 | (KR) | 10-2018-0039270 |
| May 11, 2018 | (KR) | 10-2018-0054186 |
| Jun. 22, 2018 | (KR) | 10-2018-0072259 |

(51) Int. Cl.
*H04B 17/00* (2015.01)
*H04B 7/08* (2006.01)
*H04B 17/318* (2015.01)

(52) U.S. Cl.
CPC ........... *H04B 7/088* (2013.01); *H04B 17/318* (2015.01)

(58) Field of Classification Search
CPC .......................... H04B 7/088; H04B 2201/00
(Continued)

(56) References Cited

U.S. PATENT DOCUMENTS

| 2013/0058234 A1* | 3/2013 | Yang | H04W 72/0446 370/252 |
| 2014/0177531 A1* | 6/2014 | Imamura | H04L 5/0094 370/328 |

(Continued)

OTHER PUBLICATIONS

CATT, "Mobility Management based on SS block and CSI-RS measurements," R1-1800234, 3GPP TSG RAN WG1 Meeting AH 1801, Vancouver, Canada, dated Jan. 22-26, 2018, 7 pages.

(Continued)

*Primary Examiner* — Kathy W Wang-Hurst
*Assistant Examiner* — Max Mathew
(74) *Attorney, Agent, or Firm* — Fish & Richardson P.C.

(57) ABSTRACT

One disclosure of the present specification provides a method by which user equipment (UE) performs a measurement. The method comprises the steps of: receiving, from a serving cell, a synchronization signal (SS)/physical broadcast channel (PBCH) block (SSB), wherein the SSB is used for radio link monitoring (RLM); and performing an RLM measurement on the basis of an RLM-reference signal (RLM-RS) included in the SSB, wherein, if the SSB is quasi-co-located (QCL) with respect to a channel-state information (CSI) reference signal (CSI-RS) resource, the RLM measurement is performed during a first evaluation period on the basis of a first value and, if the SSB is not QCL with respect to the CSI-RS resource, the RLM measurement is performed during a second evaluation period on the basis of a second value, and the first evaluation period is smaller than the second evaluation period.

16 Claims, 23 Drawing Sheets

(58) Field of Classification Search
USPC .................................................. 455/226.2
See application file for complete search history.

(56) References Cited

U.S. PATENT DOCUMENTS

| | | | | |
|---|---|---|---|---|
| 2014/0177601 | A1* | 6/2014 | Nishio | H04W 76/27 370/332 |
| 2015/0087352 | A1* | 3/2015 | Lim | H04L 5/0073 455/522 |
| 2015/0358105 | A1* | 12/2015 | Jung | H04L 1/0001 370/329 |
| 2015/0358855 | A1* | 12/2015 | Yang | H04W 24/08 370/252 |
| 2015/0358974 | A1* | 12/2015 | Jung | H04L 5/0032 370/329 |
| 2015/0358975 | A1* | 12/2015 | Yang | H04W 72/082 370/336 |
| 2015/0372779 | A1* | 12/2015 | Lim | H04W 56/003 370/338 |
| 2015/0373569 | A1* | 12/2015 | Hwang | H04W 72/082 370/235 |
| 2016/0029321 | A1* | 1/2016 | Hwang | H04L 5/0073 455/450 |
| 2016/0338055 | A1* | 11/2016 | Yang | H04W 76/14 |
| 2017/0048690 | A1* | 2/2017 | Yang | H04L 5/0057 |
| 2017/0086148 | A1* | 3/2017 | Jung | H04W 52/146 |
| 2017/0117997 | A1* | 4/2017 | Park | H04L 1/0026 |
| 2017/0257780 | A1* | 9/2017 | Ryoo | H04W 36/28 |
| 2018/0019800 | A1* | 1/2018 | Buer | H01Q 1/288 |
| 2018/0278314 | A1* | 9/2018 | Nam | H04W 72/042 |
| 2019/0123864 | A1* | 4/2019 | Zhang | H04B 7/024 |
| 2019/0297537 | A1* | 9/2019 | Tsai | H04W 76/27 |
| 2019/0393980 | A1* | 12/2019 | Lin | C12P 5/023 |
| 2020/0252951 | A1* | 8/2020 | Frenne | H04B 7/0617 |
| 2020/0305088 | A1* | 9/2020 | Nory | H04L 25/0226 |
| 2020/0395994 | A1* | 12/2020 | Li | H04B 7/0626 |
| 2020/0395995 | A1* | 12/2020 | Eriksson | H04L 25/0228 |

OTHER PUBLICATIONS

Huawei, HiSilicon, "Discussion on scope of CSI-RS RRM requirement," R4-1802665, 3GPP TSG-RAN WG4 Meeting #86, Athens, Greece, dated Feb. 26-Mar. 2, 2018, 6 pages.

Intel, "SSB based RLM measurement period for DRX case," R4-1802189, 3GPP TSG-RAN WG4 #86, Athens, GR, dated Feb. 26-Mar. 2, 2018, 6 pages.

Motorola Mobility, Lenovo, "Remaining details on radio link monitoring," R1-1802677, 3GPP TSG RAN WG1 Meeting #92, Athens, Greece, dated Feb. 26-Mar. 2, 2018, 6 pages.

Nokia, Nokia Shanghai Bell, "Radio Link Monitoring In NR," R1-1720885, Revision of R1-1718803, 3GPP TSG-RAN WG1 meeting #91, Reno, Nevada, USA, dated Nov. 27-Dec. 1, 2017, 9 pages.

* cited by examiner

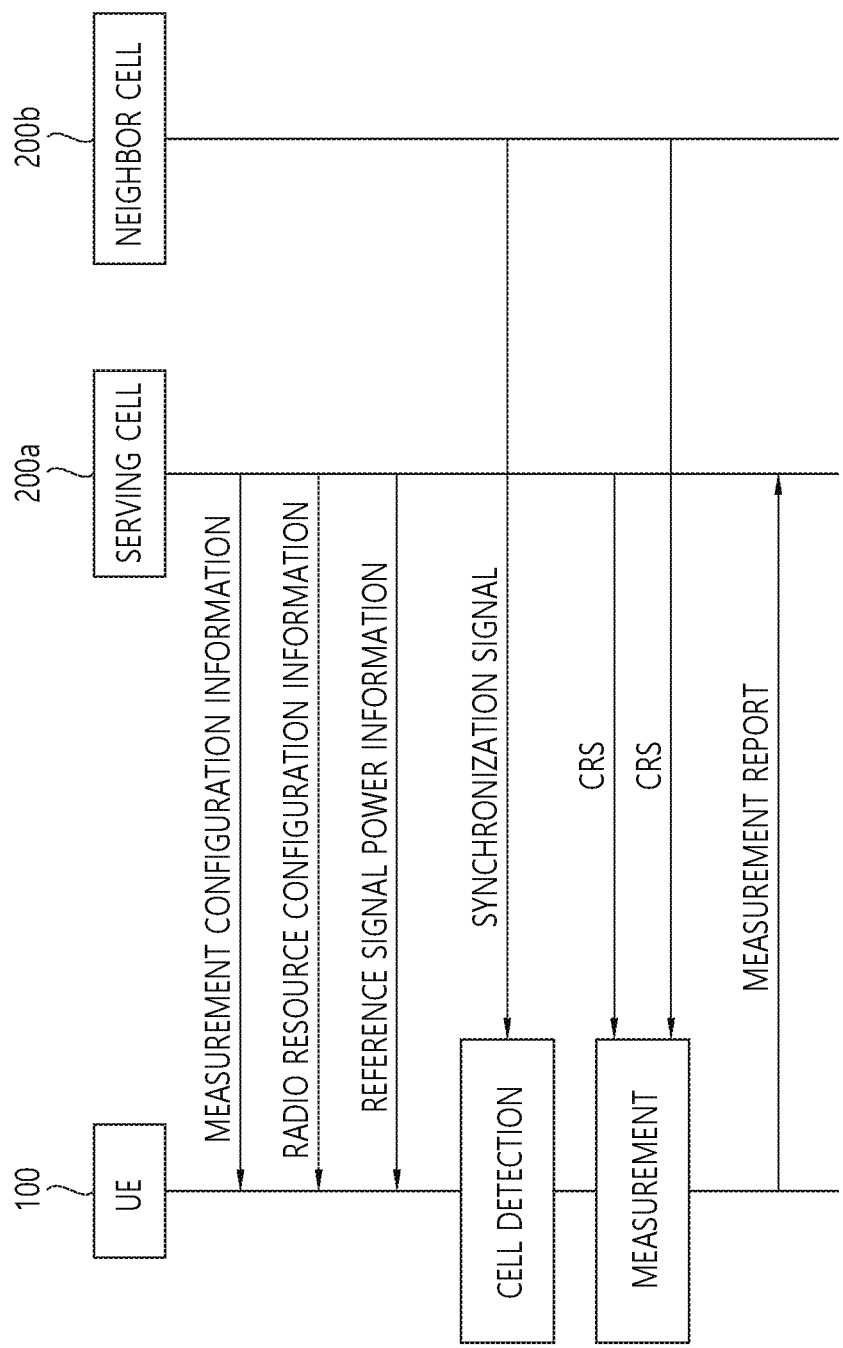

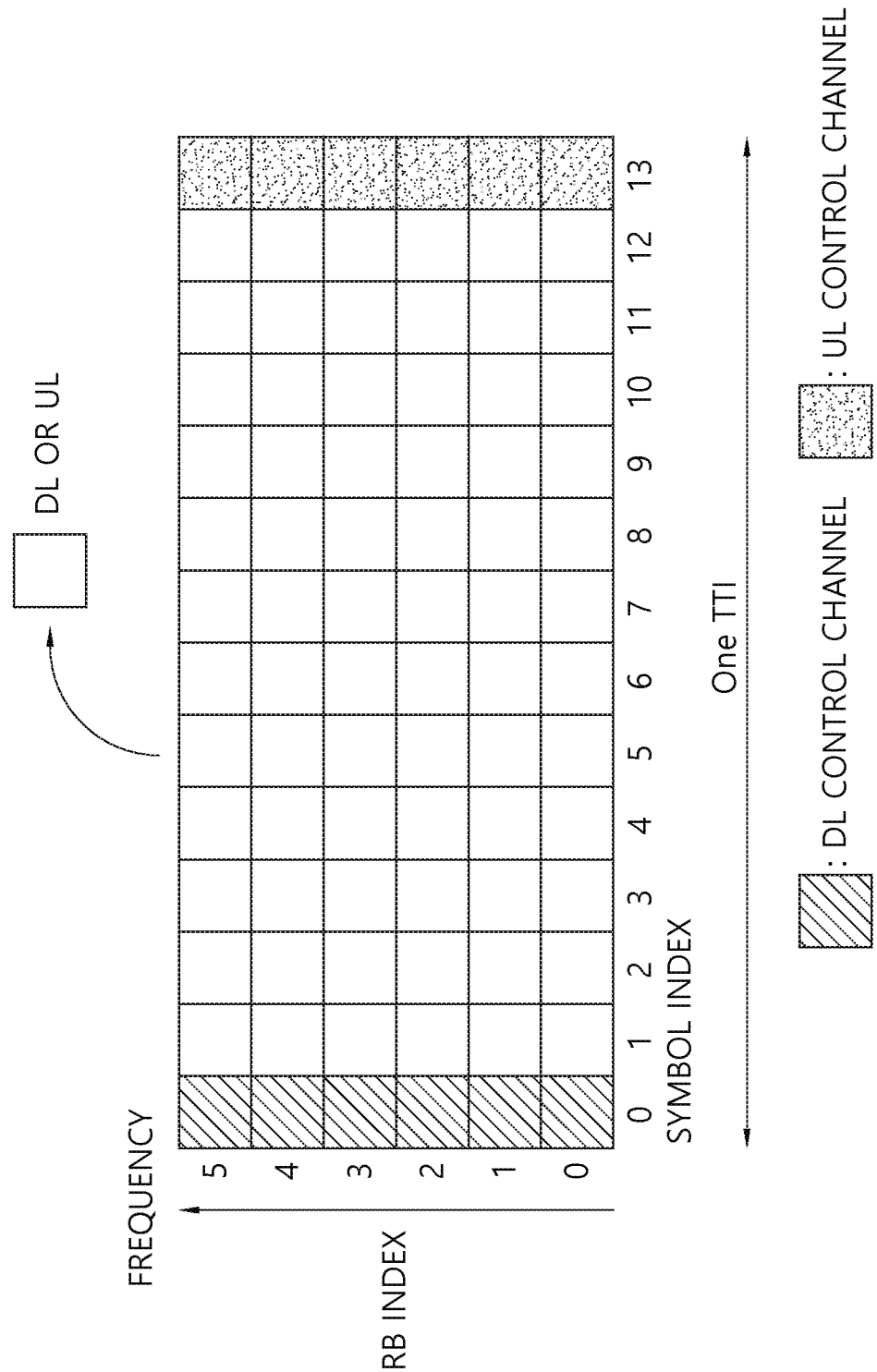

METHOD FOR PERFORMING MEASUREMENT, USER EQUIPMENT AND BASE STATION

CROSS-REFERENCE TO RELATED APPLICATIONS

Pursuant to 35 U.S.C. § 119(e), this application is a continuation of International Application PCT/KR2019/003785, with an international filing date of Apr. 1, 2019, which claims the benefit of Korean Patent Applications No. 10-2018-0039270 filed on Apr. 4, 2018, No. 10-2018-0054186 filed on May 11, 2018, and No. 10-2018-0072259 filed on Jun. 22, 2018, the contents of which are all hereby incorporated by reference herein in their entirety.

FIELD OF THE SPECIFICATION

The present specification relates to next generation mobile communication.

DISCUSSION OF THE RELATED ART

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

An operating band in NR is divided into frequency range 1 (FR1) band and FR2 band. FR1 band means a frequency band of 6 GHz or less and FR2 band means a frequency band exceeding 6 GHz.

A user equipment (UE) operating in FR1 band, that is, FR1 UE, performs uplink signal transmission and downlink signal reception using an omnidirectional beam as in LTE.

A UE operating in FR2, that is, FR2 UE (mmWave NR UE), can improve transmission and reception performance by performing uplink signal transmission and downlink signal reception using a plurality of beams.

A UE operating in FR2 performs radio link monitoring (RLM) using a plurality of reception beams. In detail, since the UE uses a plurality of reception beams, the UE selects a best beam through beam sweeping and performs RLM measurement using the selected best beams. The UE performs RLM measurement, based on measurement requirements related to RLM, but the number of reception beams of the UE and beam sweeping were not considered in the existing measurement requirements. Accordingly, according to the measurement requirement of the related art, there is a problem in that a UE cannot perform efficient RLM measurement.

SUMMARY

Accordingly, disclosures of the specification are provided to solve the problems described above.

In order to achieve the objects, a disclosure of the specification provides a method for performing measurement, the method performed by a user equipment (UE). The method includes: receiving an SS (Synchronization Signal)/PBCH (Physical Broadcast Channel) Block (SSB) from a serving cell, wherein the SSB is used for radio link monitoring (RLM); and performing RLM measurement, based on an RLM-reference signal (RLM-RS) included in the SSB, in which when the SSB is quasi-co-located (QCL) with a channel-state information (CSI)-reference signal (CSI-RS) resource, the RLM measurement is performed during a first evaluation period based on a first value; when the SSB is not QCL with the CSI-RS resource, the RLM measurement is performed during a second evaluation period based on a second value; and wherein the first evaluation period is smaller than the second evaluation period.

The method further includes: receiving the CSI-RS signal; and determining a predetermined number of best beams by measuring RSRP (reference signal received power) for the CSI-RS resource through a beam sweeping operation based on a plurality of reception beams, in which when the SSB is QCL with the CSI-RS, the RLM measurement is performed for the predetermined number of best beams and the first evaluation period.

The method further includes receiving information that the SSB is QCL with the CSI-RS resource from the serving cell.

The method further includes determining the number of reception beams to be used for the RLM measurement by performing a beam sweeping operation based on a plurality of beams on the SSB when the SSB is not QCL with the CSI-RS resource, in which the second evaluation period is determined, based on the determined number of reception beams.

The CSI-RS resource is repeatedly received from the serving cell, the method further comprises determining the number of reception beams to be used for the RLM measurement by performing a reception beam sweeping operation based on a plurality of reception beams on the CSI-RS resource during a period in which the CSI-RS resource is repeatedly received, when the SSB is not QCL with the CSI-RS resource, in which the second evaluation period is determined, based on the determined number of reception beams.

The CSI-RS resource is repeatedly received before a period in which the SSB is transmitted.

The method further includes transmitting information about the number of reception beams that the UE prefers for beam management to the serving cell, in which the second evaluation period is determined, based on the number of reception beams that are received for the beam management.

In order to achieve the objects, a disclosure of the specification provides a method for performing measurement, the method performed by a base station. The method includes: transmitting an SS (Synchronization Signal)/PBCH (Physical Broadcast Channel) Block (SSB) to a user equipment (UE), the SSB being used for radio link monitoring (RLM) and the SSB including an RLM-reference signal (RLM-RS); and transmitting information that the SSB is QCL with a channel-state information (CSI)-reference signal (CSI-RS) resource, in which the information that the SSR is QCL with the CSI-RS is used for the UE to perform RLM measurement based on the RLM-RS.

The method further includes transmitting the CSI-RS resource to the UE.

The CSI-RS resource is repeatedly transmitted to the UE.

The CSI-RS resource is repeatedly transmitted to the UE before a period in which the SSB is transmitted.

The information that the SSB is QCL with the CSI-RS resource is used for the UE to determine an evaluation period related to the RLM measurement.

The method further includes receiving information about the number of reception beams, which the UE prefers for beam management, from the UE.

In order to achieve the objects, a disclosure of the specification provides a processor of a radio device. The processor controls the radio device, and the processor receives an SS (Synchronization Signal)/PBCH (Physical Broadcast Channel) Block (SSB) from a serving cell, wherein the SSB is used for radio link monitoring (RLM) and performs RLM measurement, based on an RLM-reference signal (RLM-RS) included in the SSB, when the SSB is quasi-co-located (QCL) with a channel-state information (CSI)-reference signal (CSI-RS) resource, the RLM measurement is performed during a first evaluation period based on a first value, when the SSB is not QCL with the CSI-RS resource, the RLM measurement is performed during a second evaluation period based on a second value, and wherein the first evaluation period is smaller than the second evaluation period.

The processor receives information that the SSB is QCL with the CSI-RS from the serving cell.

Existing problems are solved by the disclosure of the specification.

BRIEF DESCRIPTION OF THE DRAWINGS

FIG. 3 illustrates a procedure for cell detection and measurement.

FIG. 5 illustrates an example of a subframe type in NR.

DESCRIPTION OF EXEMPLARY EMBODIMENTS

Figure 1:
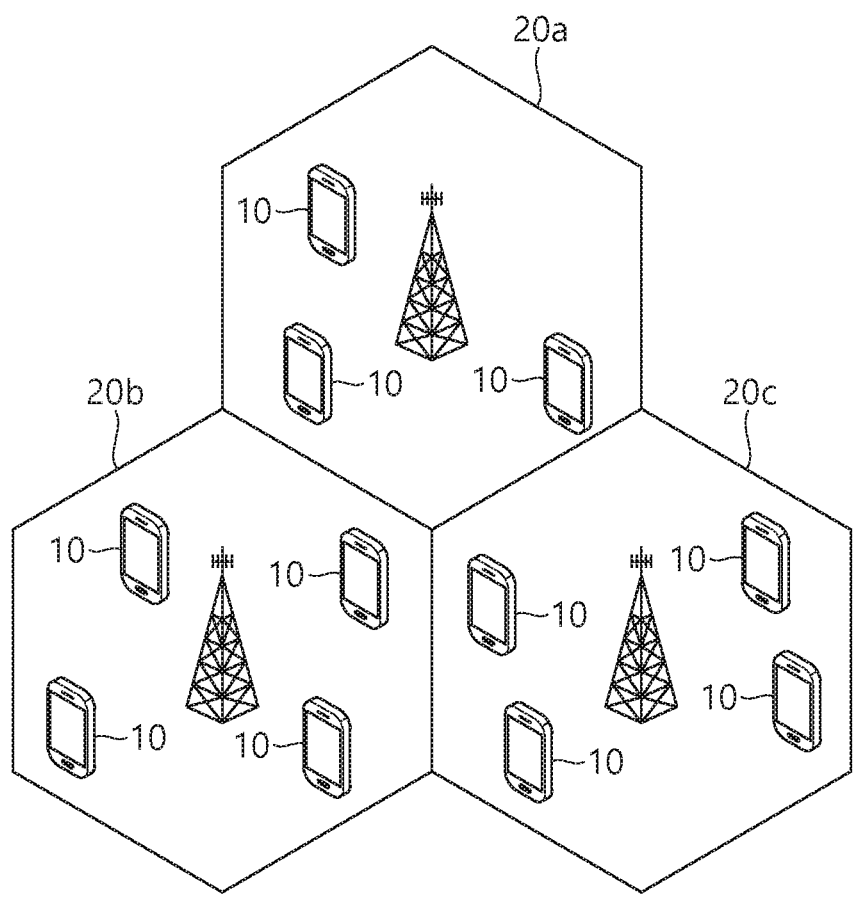
FIG. 1 is a wireless communication system.

Hereinafter, based on 3rd Generation Partnership Project (3GPP) long term evolution (LTE), 3GPP LTE-advanced (LTE-A), or 3GPP NR(New RAT) the present disclosure will be applied. This is just an example, and the present disclosure may be applied to various wireless communication systems. Hereinafter, LTE includes LTE and/or LTE-A.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 is a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
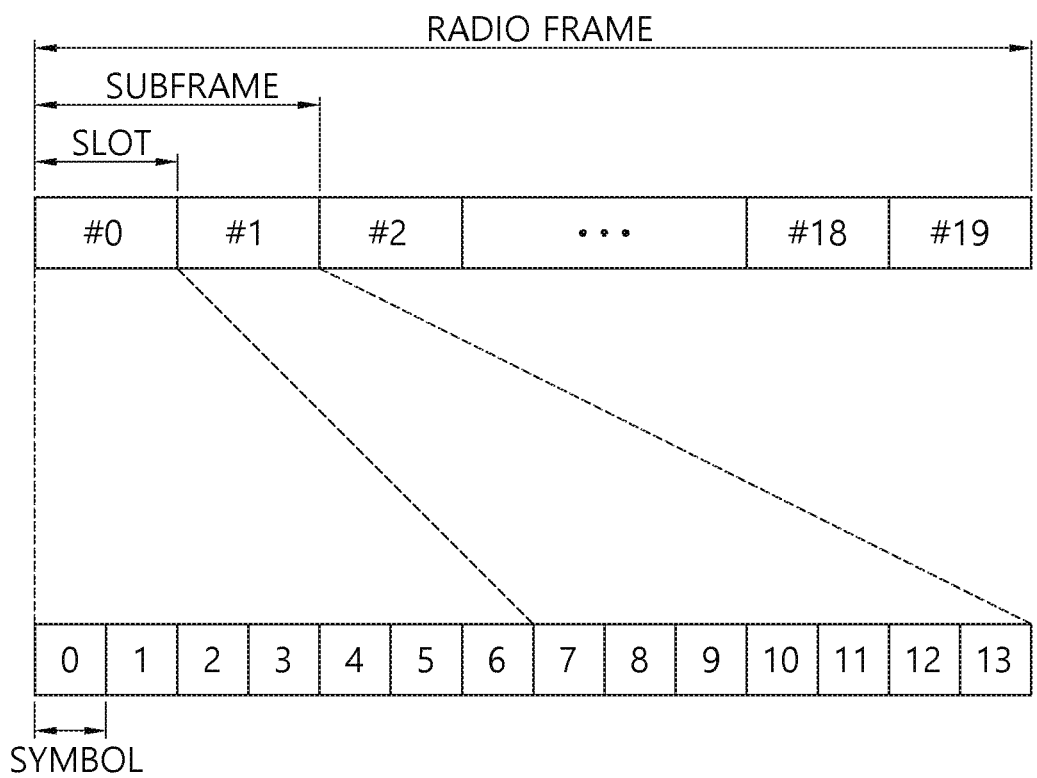
FIG. 2 illustrates a structure of a radio frame according to FDD in 3GPP LTE.

FIG. 2 shows a downlink radio frame structure according to FDD of 3rd generation partnership project (3GPP) long term evolution (LTE).

Referring to FIG. 2, the radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM (orthogonal frequency division multiplexing) symbols. How many OFDM symbols are included in one slot may depend on the cyclic prefix (CP).

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (Pcell) based on a CRS. This is so called Radio Link Monitoring (RLM).

FIG. 3 shows a procedure for cell detection and measurement.

Referring to FIG. 3, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRSs based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

Meanwhile, the UE 100 receives a measurement configuration information element (IE) from the serving cell 100a for the measurement. A message including the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. A message including the measurement result is called a measurement report message.

The measurement configuration IE may include measurement object information. The measurement object information is information about an object on which a UE performs measurement. The measurement object includes at least any one of an intra-frequency measurement object that is an object of intra-cell measurement, an inter-frequency measurement object that is an object of inter-cell measurement, and an inter-RAT measurement object that is an object to inter-RAT measurement. For example, the intra-frequency measurement object may designate a surrounding cell having the same frequency band as a serving cell, the inter-frequency measurement object may designate a surrounding cell having a different frequency band from a serving cell, and the inter-RAT measurement object may designate a surrounding cell of a RAT different from the RAT of a serving cell.

TABLE 1

Measurement object field description carrierFreq
This indicates an E-UTRA carrier frequency to which this configuration is applied.
measCycleSCell
This indicates a cycle for measurement of a secondary cell (SCell) in a non-activated state.
Its value may be set to 40, 160, 256, etc. If the value is 160, it indicates that measurement is performed every 160 subframes.

Meanwhile, the measurement configuration IE includes an information element (IE) as shown in the following table.

TABLE 2

MeasConfig field description allowInterruptions
If its value is True, it indicates that interruption of transmission and reception with a serving cell is allowed when measurement of subcarriers of an Scell in a non-active state is performed using MeasCycleScell.
measGapConfig
It indicates configuration or cancelation of a measurement gap.

The "measGapConfig" is used to configure or cancel a measurement gap (MG). The MG is a period for cell identification and RSRP measurement on an inter frequency different from that of a serving cell.

TABLE 3

MeasGapConfig Field Description gapOffset
Any one of gp0, gp1, gp2, and gp3 may be configured as the value of gapOffset. gp0 corresponds to the gap offset of pattern ID "0" having MGRP = 40 ms. Gp1 corresponds to the gap offset of pattern ID "1" having MGRP = 80 ms. gp2 corresponds to the gap offset of pattern ID "2" having MGRP = 40 ms and MGL = 3 ms. Gp3 corresponds to the gap offset of pattern ID "3" having MGRP = 80 ms and MGL = 3 ms.

TABLE 4

| Gap pattern Id | Measurement Gap Length (MGL) | Measurement Gap Repetition Period (MGRP) | Minimum available time for inter-frequency and inter-RAT measurements during 480 ms period |
| --- | --- | --- | --- |
| 0 | 6 ms | 40 ms | 60 ms |
| 1 | 6 ms | 80 ms | 30 ms |
| 2 | 3 ms | 40 ms | 24 ms |
| 3 | 3 ms | 80 ms | 12 ms |

When the UE requires a measurement gap to identify and measure a cell at an inter-frequency and inter-RAT, the E-UTRAN (i.e., the base station) may provide a single measurement gap (MG) pattern with a predetermined gap period to the UE.

Without transmitting or receiving any data from the serving cell for the measurement gap period, the UE retunes its RF chain to be adapted to the inter-frequency and then performs measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Internet of Things (IoT) Communication>

Hereinafter, IoT will be described.

The IoT communication refers to the exchange of information between an IoT devices without human interaction through a base station or between the IoT device and a server through the base station. In this way, the IoT communication is also referred to as CIoT (Cellular Internet of Things) in that the IoT communication is performed through the cellular base station.

This IoT communication is a kind of machine type communication (MTC). Therefore, the IoT device may be referred to as an MTC device.

The IoT communication has a small amount of transmitted data. Further, uplink or downlink data transmission/reception rarely occurs. Accordingly, it is desirable to lower a price of the IoT device and reduce battery consumption in accordance with the low data rate. In addition, since the IoT device has low mobility, the IoT device has substantially the unchanged channel environment.

In one approach to a low cost of the IoT device, the IoT device may use, for example, a sub-band of approximately 1.4 MHz regardless of a system bandwidth of the cell.

The IoT communication operating on such a reduced bandwidth may be called NB (Narrow Band) IoT communication or NB CIoT communication.

<Next-Generation Mobile Communication Network>

By success of LTE (long term evolution)/LTE-Advanced (LTE-A) for fourth-generation mobile communication, the next, that is, the fifth-(so-called 5G) mobile communication is increasingly interested and researches are continuously conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 4A:
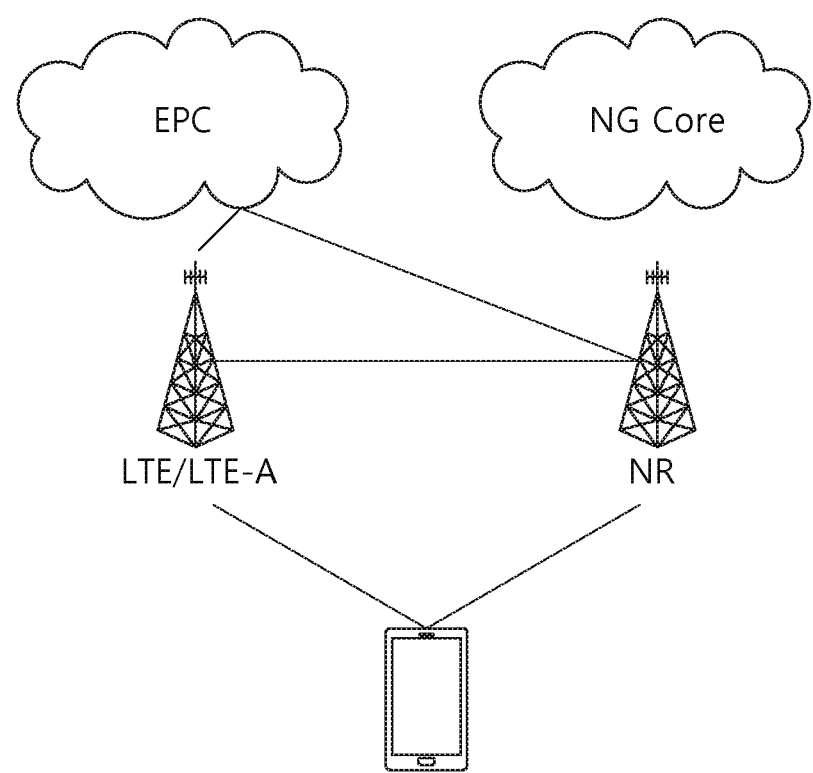
FIGS. 4A to 4C are exemplary diagrams illustrating exemplary architecture for a service of the next-generation mobile communication.
Figure 4B:
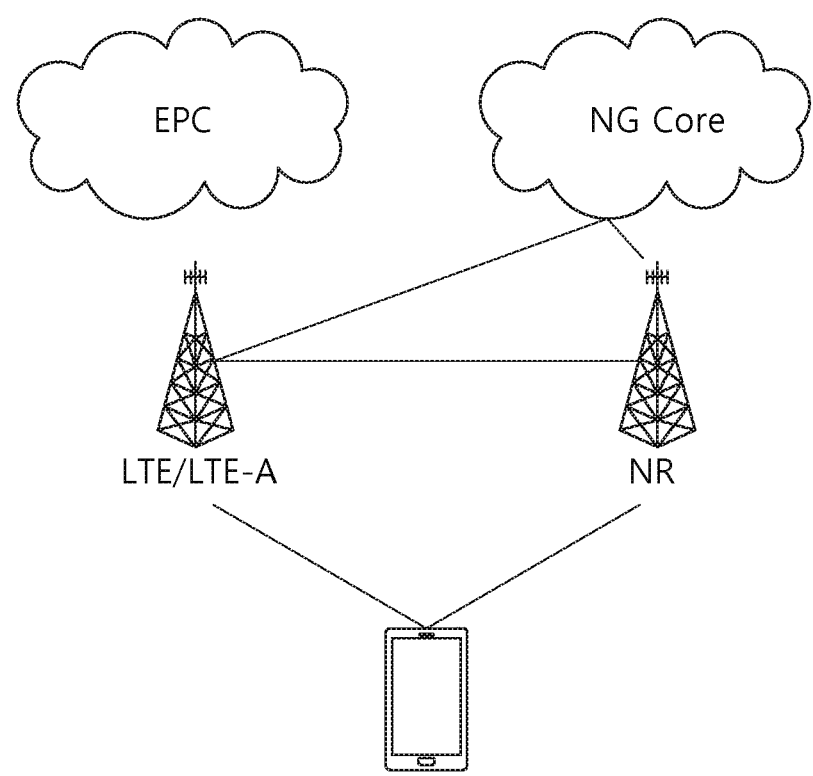
Figure 4C:
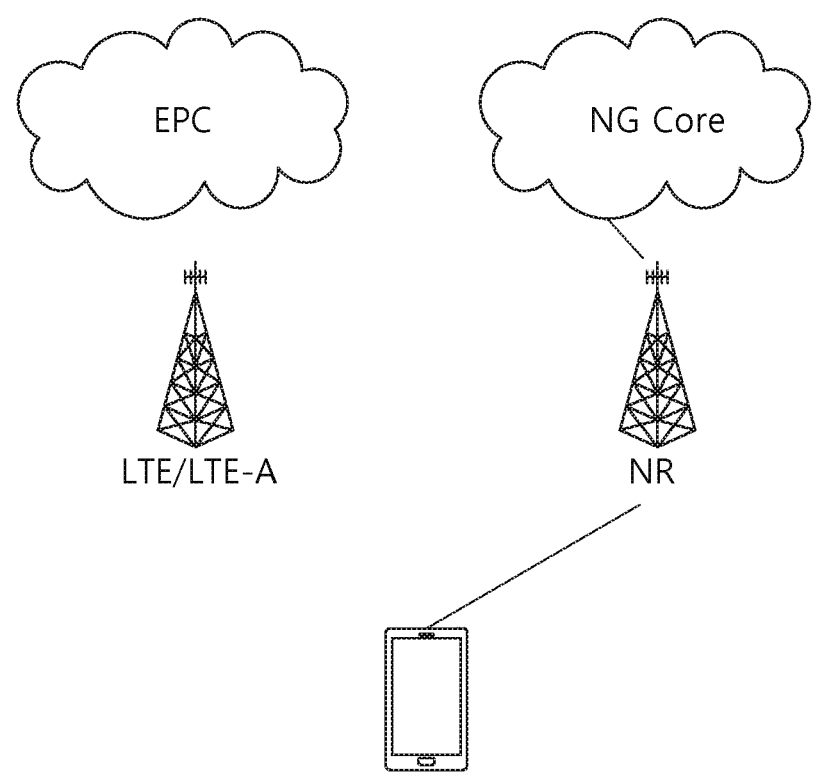

FIGS. 4A to 4C are exemplary diagrams illustrating exemplary architecture for a next-generation mobile communication service.

Referring to FIG. 4A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 4B, the LTE/LTE-A cell is connected with a core network for 5th generation mobile communication, that is, a Next Generation (NG) core network, unlike the example in FIG. 4A.

A service based on the architecture shown in FIGS. 4A and 4B is referred to as a non-standalone (NSA) service.

Referring to FIG. 4, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

FIG. 5 illustrates an example of subframe type in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 5

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OFDM symbols per slot $N^{slot}_{symb}$, the number of slots per frame $N^{frame,\mu}_{slot}$, and the number of slots per subframe Nsubframe,μslot are expressed as shown in the following table.

TABLE 6

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OFDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 7

| μ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 8

| For- | Symbol Number in Slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | D | D | D | D | D | D | D | X |
| 47 | D | D | D | D | D | X | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | D | X | U | D | D | D | D | D | X | U |
| 55 | D | D | X | U | U | U | U | D | X | U | U | U | U | U |
| 56 | D | X | U | U | U | U | U | D | X | U | U | U | U | U |
| 57 | D | D | D | X | X | U | U | D | D | D | X | X | U | U |
| 58 | D | D | X | X | U | U | U | D | D | X | X | U | U | U |
| 59 | D | X | X | U | U | U | U | D | X | X | U | U | U | U |
| 60 | D | X | X | X | X | U | D | X | X | X | X | X | X | U |
| 61 | D | D | X | X | X | X | D | D | X | X | X | X | X | U |

<Operating Band in NR>

An operating band in NR is divided into frequency range 1 (FR1) band and FR2 band. FR1 band means a frequency band of 6 GHz or less and FR2 band means a frequency band exceeding 6 GHz. FR1 band and FR2 band are defined as shown in the following table 9.

TABLE 9

| Frequency band designation | Corresponding frequency range |
|---|---|
| Frequency Range 1 (FR 1) | 450 MHz-6000 MHz |
| Frequency Range 2 (FR 2) | 24250 MHz-52600 MHz |

Operating bands in the following table 10 are operating bands refarming from operating bands of LTE/LTE-A and correspond to FR1 band.

TABLE 10

| NR Operating Band | Uplink (UL) Operating Band $F_{UL\_low}$-$F_{UL\_high}$ | Downlink (DL) Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table 11 shows NR operating bands defined at high frequencies which correspond to FR2 band.

TABLE 11

| NR Operating Band | Uplink (UL) Operating Band $F_{UL\_low}$-$F_{UL\_high}$ | Downlink (DL) Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

Meanwhile, when the operating band shown in the above table is used, a channel bandwidth is used as shown in the following table.

TABLE 12

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table 12, SCS indicates a subcarrier spacing. In the above table, NRB indicates the number of RBs. Meanwhile, when the operating band shown in the above table is used, a channel bandwidth is used as shown in the following table.

TABLE 13

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<CSI-RS>

A CSI-RS is a CSI (Channel-State Information) reference signal. The CSI-RS is a reference signal that is used when a UE reports to a serving cells related to feedback of CSI.

CSI-RS may be composed of a combination of one or more CSI-RS configurations. A zero-power CSI-RS and non-zero-power CSI are defined.

For a no-zero-power CSI-RS, a sequence is created in accordance with 7.4.1.5.2 of 3GPP TS 38.211 and is mapped to a resource element in accordance with 7.4.1.5.3.

For the zero-power CSI-RS, a UE estimates that resource elements defined at 7.4.1.5.3 of 3GPP TS 38.211 are not transmitted to PDSCH and not perform any estimation on downlink transmission of the resource elements.

CSI-RS location in slot

1) Frequency location: The start subcarrier of a component RE pattern is as follows no limitation for 1 port CSI-RS.

limited to one of even number of subcarriers for Y=2.

limited to one of 0, 4, 8 for Y=4.

where, Y is the gap of the start subcarrier.

2) (Time location): Transmitted from 5, 6, 7, 8, 9, 10, 12, 13 OFDM symbols.

Cycle

The following CSI-RS transmission cycle is supported a NR.

{5, 10, 20, 40, 80, 160, 320, 640} slots

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block.

In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 6A:
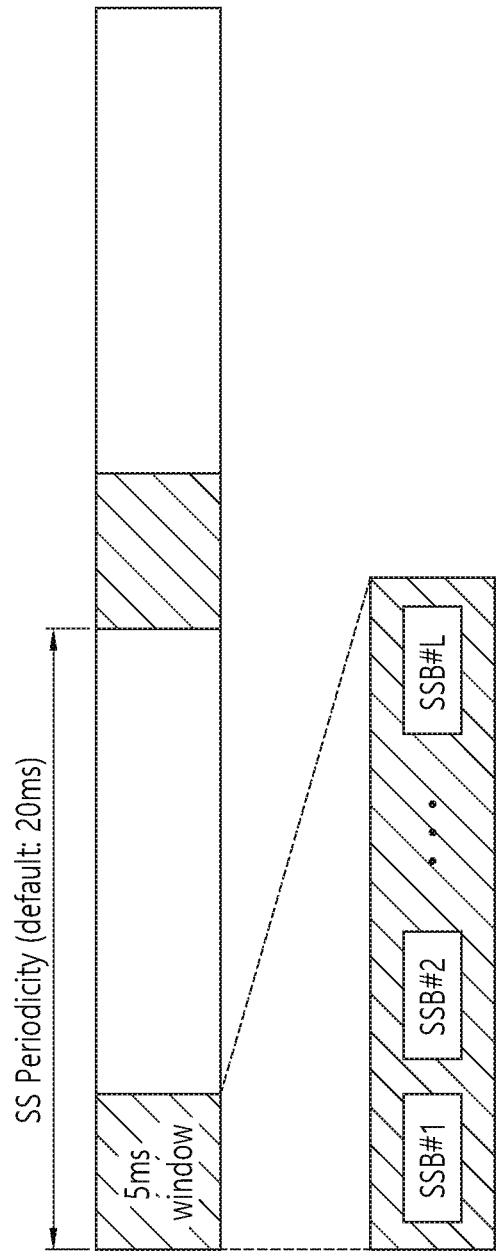
FIGS. 6A and 6B are exemplary diagrams illustrating the structure of an SSB at NR.
Figure 6B:
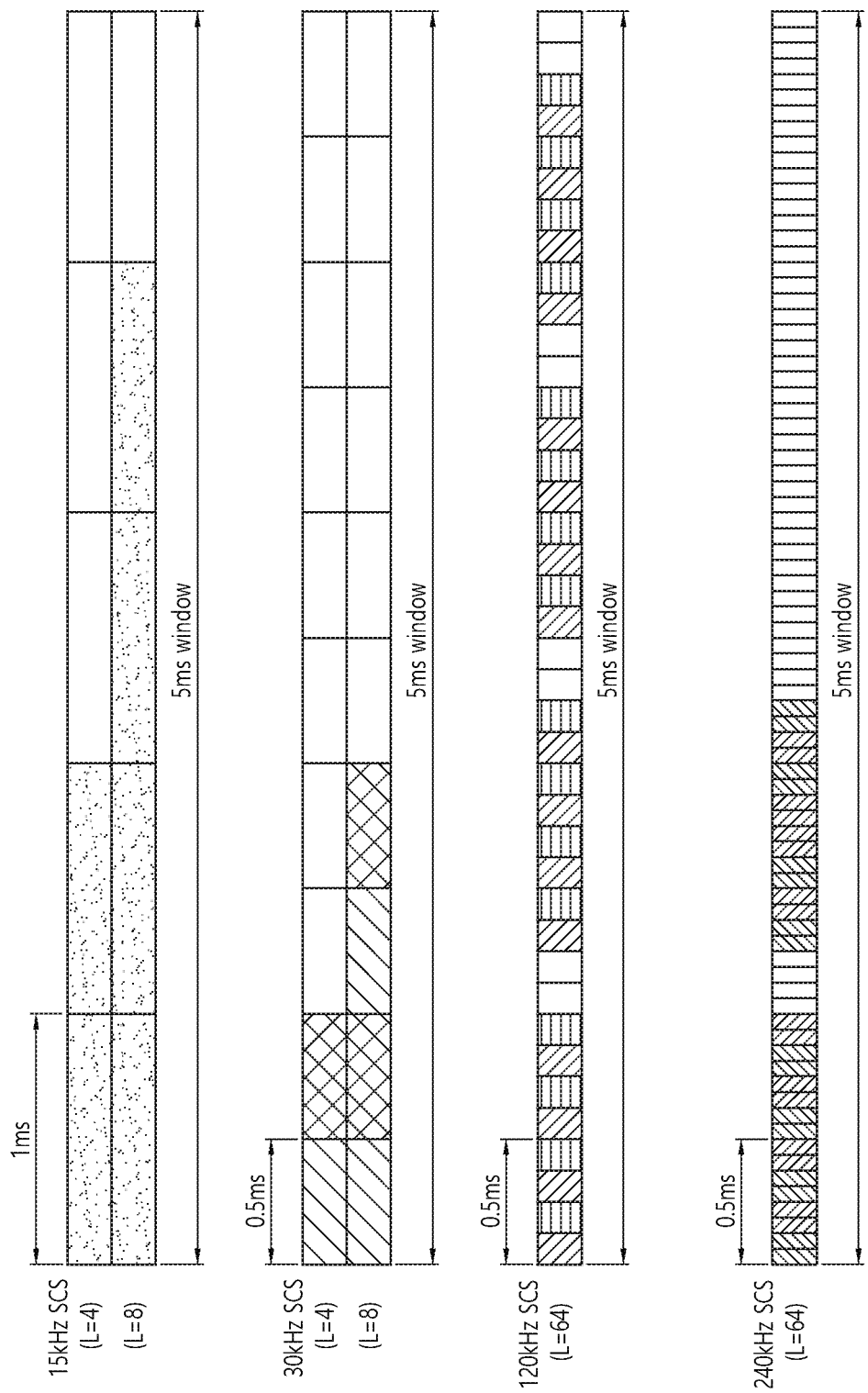

FIGS. 6A and 6B are Exemplary Diagrams Illustrating the Structure of an SSB at NR.

Referring to FIGS. 6A and 6B, SSBs may be transmitted into a window with a length of 5 ms regardless of the cycle of an SS burst set. The candidate number of the SSB that can be positioned in the 5 ms window may be L.

For various frequency bands, the maximum number L of SSBs in an SS burst set may be as the following examples (for reference, the minimum number of the SSB in the SS burst set is assumed as 1 to define performance requirement).

frequency band less than 3 GHz: L=4 frequency band of 3 GHz~6 GHZ: L=8 frequency band of 6 GHz~52.6 GHz: L=64

Further, as shown in FIG. 6A, an SSB cycle may be 20 ms. In detail, the default value for initial cell selection may be 20 ms. Further, the SSB cycle in RRC CONNECTED/RRC IDLE and NSA, for example, may be one of {5,10, 20,40,80,160} ms.

An example of an SSB configuration in a 5 ms window is shown in FIG. 6B. Referring to FIG. 6B, examples of SSB according to L in SCS (subcarrier spacing) and each SCS are shown in FIG. 6B. In FIG. 6B, two SSBs may be positioned in each colored area. For example, when L=4 in 15 kHz SCS, two SSBs are positioned in each of two colored area, so a total of 4 SSBs can be transmitted from the 5 ms window. As another example, when L=64 in 240 kHz SCS, SSBs are respectively positions in 32 colored areas, so a total of 64 SSBs can be transmitted to the 5 ms window.

Time-Frequency Structure of an SS/PBCH Block

In a time domain, an SSB may be composed of 4 OFDMs. Here, the 4 OFDMs may be numbered from 0 to 3 in ascending order in the SSB. In the SSB, PSS, SSS, and PBCH (related with DM-RS) may use OFDM symbols.

In a frequency domain, an SSB may include 240 continuous subcarriers. Here, the subcarriers may be numbered from 0 to 239 in the SSB. k is a frequency index, l is assumed as a time index, and k and l may be defined in the SSB.

Figure 14:
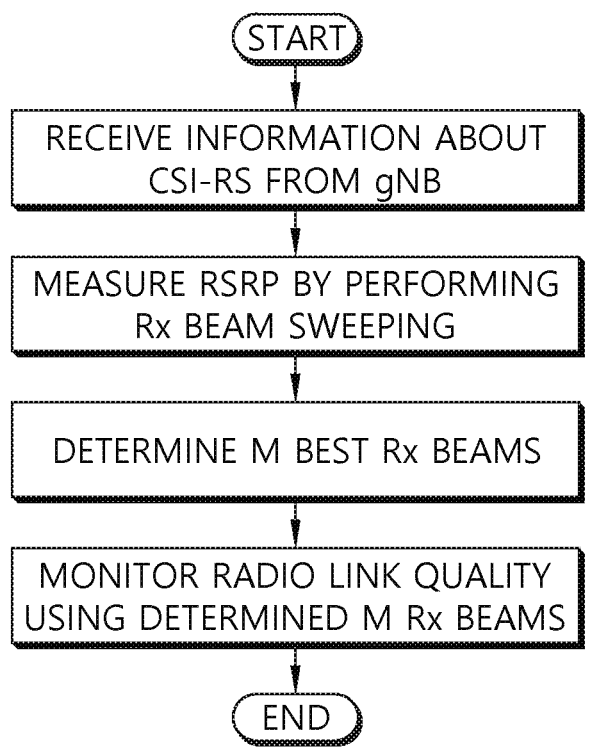
FIG. 14 is a flowchart illustrating a first example in which a UE performs RLM measurement.

A UE may assume that the resource element designated by "set to 0" is set as 0 in the example of FIG. 14. A subcarrier 0 in the SSB may corresponds to a subcarrier $k_0$ of a common resource block $N_{CRB}^{SSB}$. Here, for $N_{CRB}^{SSB}$ the UE may be acquired by higher-layer signaling. For example, $N_{CRB}^{SSB}$ may be acquired from a higher-layer parameter offset-ref-low-scs-ref-PRB. A certain common resource block partially or fully overlapping the SSB may be viewed as occupied or may by viewed as being not transmitted to PDSCH or PDCCH. A resource element 0 that is a portion of common resources, which are not transmitted to the SSB but partially overlap the SSB, may be estimated as being set as 0.

For the SSB, the UE may estimate the followings.

Antenna port p-4000

CP and SCS with the same length may be used for PSS, SSS, and PBCH.

For a specific SSB type (e.g., SSB type A), $k_0 \in \{0, 12, \ldots, 23\}$, $\mu \in \{0,1\}$ and $N_{CRB}^{SSB}$ may be expressed in unit of 15 kHz SCS.

For a specific SSB (e.g., SSB type B), $k_0 \in \{0, 12, \ldots, 11\}$, $\mu \in \{3,4\}$ and $N_{CRB}^{SSB}$ may be expressed in unit of 60 kHz SCS.

The UE may estimate that an SSB transmitted to the same block index is QCL (quasi co-located) for Doppler spread, Doppler shift, average gain, average delay, and spatial Rx parameters. The UE may not estimate that it is not QLC for other SSB transmission.

The following table 14 shows an example of resources in an SSB for DM-RS for PSS, SSS, PBCH, and PBCH in the SSB. In table 14, v may be an offset value that is used to designate the start point of the SSB.

TABLE 14

| Channel or signal | Number 1 of OFDMs for start point of SSB | Number k of subcarriers for start point of SSB |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 236 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

Figure 7:
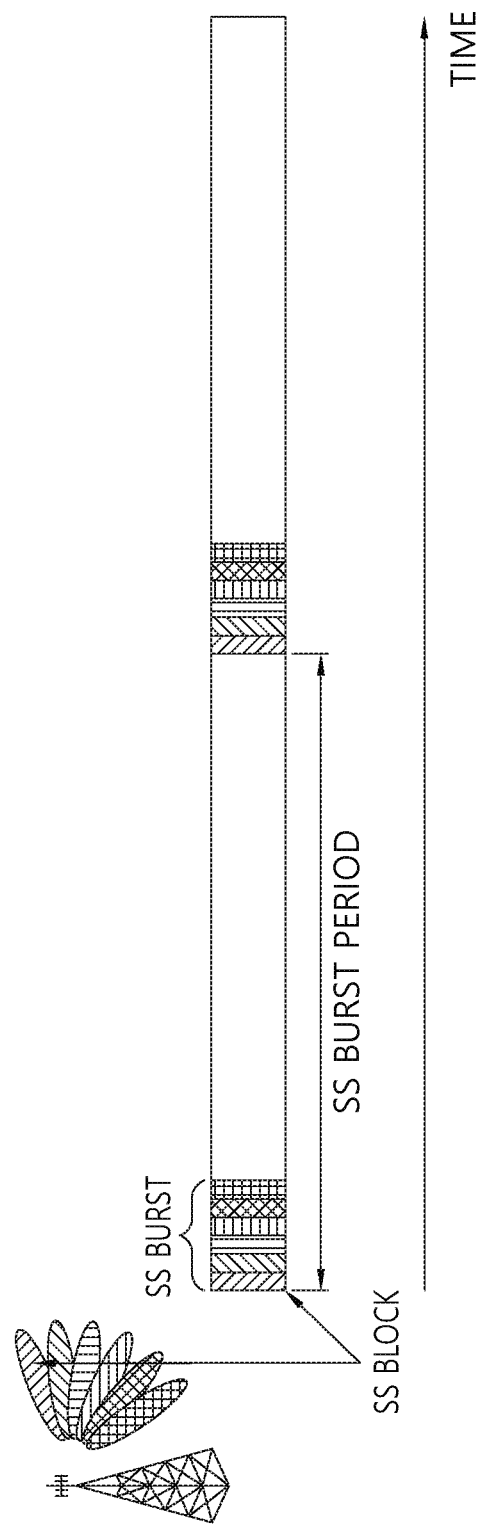
FIG. 7 is a exemplary diagram illustrating an example of an SS block in NR.

FIG. 7 is a Exemplary Diagram Illustrating an Example of an SS Block in NR.

Referring to FIG. 7, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 8.

Figure 8:
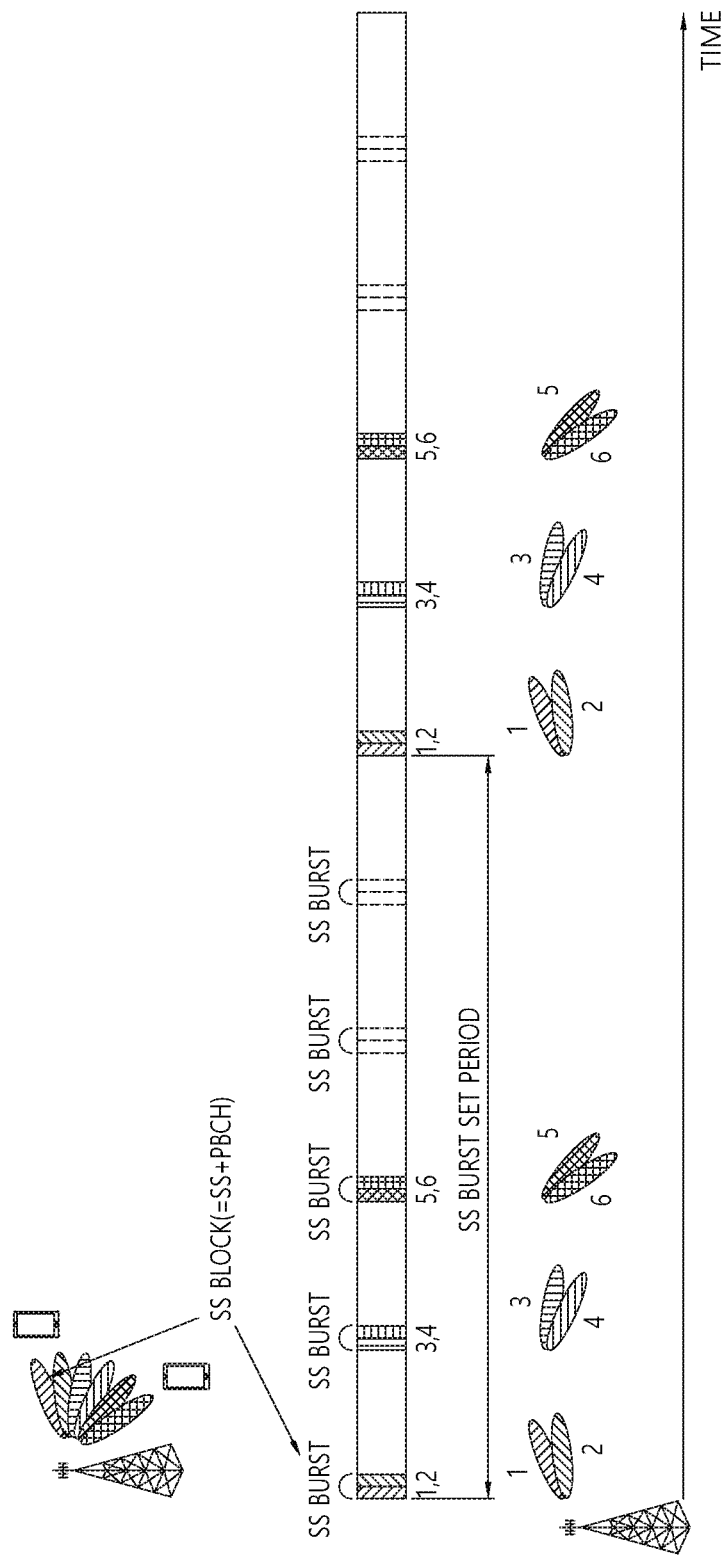
FIG. 8 an exemplary diagram illustrating an example of beam sweeping in NR.

FIG. 8 is an exemplary diagram illustrating an example of beam sweeping in the NR.

A base station transmits each SS block in an SS burst over time while performing beam sweeping. In this case, multiple SS blocks in an SS burst set are transmitted to support UEs existing in different directions. In FIG. 8, the SS burst set includes one to six SS blocks, and each SS burst includes two SS blocks.

<Channel Raster and Sync Raster>

Hereinafter, a channel raster and a sync rater will be described.

A frequency channel raster is defined as a set of RF reference frequencies ($F_{REF}$). An RF reference frequency may be used as a signal indicative of locations of an RF channel, an SS block, and the like.

A global frequency raster may be defined with respect to all frequencies from 0 GHz to 100 GHz. The granularity of the global frequency raster may be expressed by $\Delta F_{Global}$.

An RF reference frequency is designated by NR Absolute Radio Frequency Channel Number (NR-AFRCN) in the global frequency raster's range (0 . . . 2016666). A relationship between the NR-AFRCN and the RF reference frequency ($F_{REF}$) of MHz may be expressed as shown in the following equation.

$$F_{REF} = F_{REF\text{-}Offs} + \Delta F_{Global}(N_{REF} - N_{REF\text{-}Offs}) \quad [\text{Equation 1}]$$

In Equation 1, $F_{REF\text{-}Offs}$ and $N_{Ref\text{-}Offs}$ are as shown in the following table.

TABLE 15

| Frequency Range (MHz) | $\Delta F_{Global}$ (kHz) | $F_{REF\text{-}Offs}$ (MHz) | $N_{REF\text{-}Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

A channel raster indicates a subset of FR reference frequencies able to be used to identify location of an RF channel in uplink and downlink. An RF reference frequency for an RF channel may be mapped to a resource element on a subcarrier.

Mapping of the RF reference frequency of the channel raster and the corresponding resource element may be used to identify a location of an RF channel. The mapping may differ according to a total number of RBs allocated to the channel, and the mapping applies to both uplink (UL) and downlink (DL).

When $N_{RB}$ mod 2=0, the RE index k is 0, and the number of PRBs is as below.

$$n_{PRB} = \left\lfloor \frac{N_{RB}}{2} \right\rfloor$$

When $N_{RB}$ mod 2=0, the RE index k is 6, the number of PRBs is as below.

$$n_{PRB} = \left\lfloor \frac{N_{RB}}{2} \right\rfloor$$

Locations of RF channels of a channel raster in each NR operating band may be expressed as shown in the following table.

TABLE 16

| NR Operating Band | ΔF$_{Raster}$ (kHz) | Uplink Frequency Range of N$_{REF}$ (First-<Step size>-Last) | Downlink Frequency Range of N$_{REF}$ (First-<Step size>-Last) |
| --- | --- | --- | --- |
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 17

| NR Operating Band | ΔF$_{Raster}$ (kHz) | Uplink and Downlink Frequency Range (First-<Step size>-Last) |
| --- | --- | --- |
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

Meanwhile, a sync raster indicates a frequency location of an SS block used by a UE to acquire system information. The frequency location of the SS block may be defined as SSREF using a GSCN number corresponding thereto.

Figure 9:
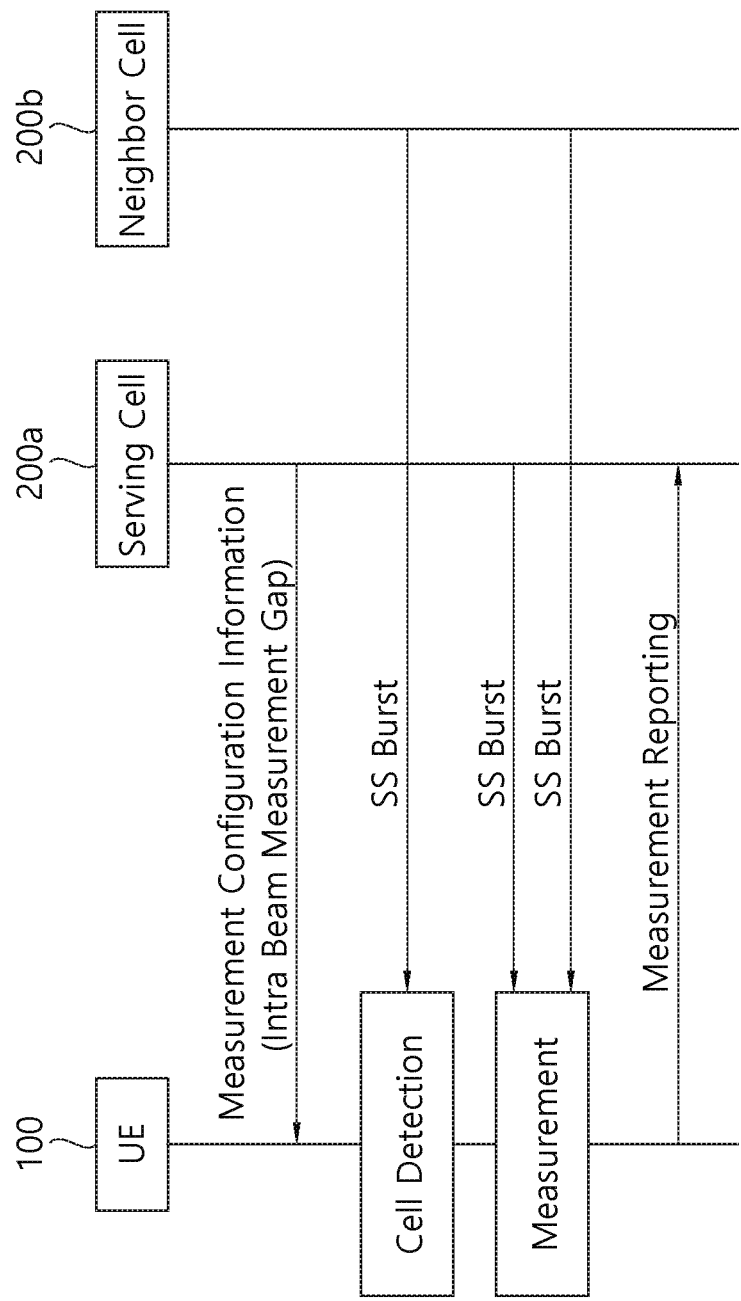
FIG. 9 illustrate a procedure of measurement and measurement report considering an SS burst.

FIG. 9 Illustrates Measurement and a Measurement Report Procedure Considering an SS Burst.

As can be seen with reference to FIG. 9, a UE may receive measurement configuration information from a serving cell. The measurement configuration information may include information on a first measurement gap, e.g., an intra beam measurement gap. In addition, the measurement configuration information may include information on a second measurement gap, e.g., an intra RSRP measurement gap.

The UE may receive an SS burst from one or more neighbor cells to perform cell detection.

In addition, the UE may perform measurement based on the SS burst received from the one or more neighbor cells during a first measurement gap (e.g., an intra beam measurement gap) indicated by the information.

In addition, although not shown, the UE may perform RSRP measurement based on a reference signal (RS) from the one or more neighbor cells during the second measurement gap.

In addition, the UE may perform measurement reporting.

<Bandwidth Part: BWP>

A wideband frequency maximally reaching 400 MHz may be used in NR. A new concept of BWP was introduced in NR to enable various UEs to efficiently distribute and use a frequency band.

When UEs transmit the information about their abilities to a base station while performing initial access, the base station may configure a BWP to be used by the UEs to the UEs and may transmit the information about the configured BWP to the UE. Accordingly, downlink and uplink data transmission and reception between the UEs and the base station are performed only through the BWP configured in the UEs. That is, configuring the BWP in the UEs by the base station is to instruct the UEs not to use frequency bands other than the BWP when performing wireless communication with the base station later.

The base station may configure the entire band of the carrier frequency reaching 400 MHz as the BWP for the UEs or may configure only some bands as the BWP for the UEs. Further, the base station may configure several BWPs for one UE. When several BWPs are configured for one UE, the frequency bands of the BWPs may overlap each other or not.

<L1-RSRP Measurement>

L1-RSRP measurement (layer 1 (physical layer) RSRP) is measurement for a UE to perform reporting to a serving cell. For example, a UE may perform L1-RSRP measurement, based on CSI-RS.

When configured by a Pcell or a PSCell, a UE may measure SSB, CSI-RS, or SSB and CSI-RS and may measure L1-RSRP of the configured SSB, CSI-RS, or SSB and CSI-RS. The L1-RSRP measurement may be performed by resources configured for L1-RSRP measurement in an active BWP.

The UE may measure all CSI-RS resources or an SSB resource of a CSI resource configured in CSI resource configuration configured by the active BWP. Unless the reporting quantity in the CSI-RS is configured as 'none', the UE may report the quantity for CSI reporting configuration related to the reporting quantity.

The UE may perform L1-RSRP measurement, based on a CSI-RS resource configured for L1-RSRP calculation. Further, the physical layer of the UE may measure L1-RSRP and report L1-RSRP, based on a measurement period related to beam management using CSI-RS.

<Radio Link Monitoring>

A UE monitors a downlink radio link quality of a primary cell to inform an upper layer of an out-of-sync/in-sync state. The UE monitors the down link quality in an active DL BWP on the primary cell and does not need to monitor it in other DL BWPs.

The UE may perform monitoring, based on RLM-RS. Here, it is a reference signal for RLM. An RLM-RS resource may be a resource included in a set of resources configured by upper layer signaling. The UE may be provided with the information about the RLM-RS from a serving cell. For example, the information about the RLM-RS may be RadioLinkMonitoringRS in Table 18.

TABLE 18

| RadioLinkMonitoringRS ::= | SEQUENCE { |
|---|---|
| radioLinkMonitoringRS-Id | RadioLinkMonitoringRS-Id, |
| purpose | ENUMERATED {beamFailure, rlf, both}, |
| detectionResource | CHOICE { |
| ssb-Index | SSB-Index, |
| csi-RS-Index | NZP-CSI-RS-ResourceId |
| } | |

In Table 18, radioLinkMonitoringRS-Id may be the ID of RLM-RS. purpose means whether a UE monitors relevant RS on the purpose of cell and/or beam failure detection. detectionResource means RS that the UE will uses for RLM or beam failure detection (in accordance with purpose). ssb-Index is the index of a relevant SSB. csi-RS-Index is the ID of an NZP-CSI-RS resource. The UE may monitor a radio link quality, based on the RS of a configured RLM-RS resource to detect the radio link quality of the Pcell and the PSCell. The configured RLM-RS resource may be all SSB, all CSI-RS, or a combination of the SSBs and the CSI-RS.

The UE may estimate the downlink radio quality from each RLM-RS and may compare the estimated quality with threshold values $Q_{in}$ and $Q_{out}$ to monitor the downlink radio link quality of a cell.

Here $Q_{out}$ may be defined as a level that the downlink radio link may not be reliability received and a level corresponding to an out-of-sync block error rate ($BLER_{out}$). $Q_{out\_SSB}$ may be used for SSB-based RLM. $Q_{out\_SSB}$ may be derived, based on virtual PDCCH transmission parameters related to the SSB-based RLM. Further, $Q_{out\_CSI-RS}$ may be used for CSI-RS-based RLM. $Q_{out\_CSI-RS}$ may be derived, based of virtual PDCCH transmission parameters related to the CSI-RS-based RLM.

$Q_{in}$ may be defined as a level that the downlink radio link quality may be more reliably received than $Q_{out}$ and as a level corresponding to an in-sync block error rate ($BLER_{in}$). $Q_{in\_SSB}$ may be used for SSB-based RLM. $Q_{in\_SSB}$ may be derived, based on virtual PDCCH transmission parameters related to the SSB-based RLM. Further, $Q_{in\_CSI-RS}$ may be used for CSI-RS-based RLM. $Q_{in\_CSI-RS}$ may be derived, based on virtual transmission parameters related to the CSI-RS-based RLM.

The physical layer of the UE informs an upper layer of out-of-sync when the radio link quality is worse than a threshold value $Q_{out}$ for all resources in a set of resources related to RLM in frames where a radio link quality is evaluated. When the radio link quality is better than a threshold value $Q_{in}$ in a certain resource in a set of resources related to the RLM, the physical layer of the UE informs an upper layer of in-sync in a frame where a radio link quality is evaluated.

$BLER_{in}$ and $BLER_{out}$ may be determined, based on network configuration. For example, $BLER_{in}$ and $BLER_{out}$ may be determined by a parameter rlmInSyncOutOfSyncThreshold received through upper layer signaling. When a UE does not receive network configuration related to the $BLER_{in}$ and $BLER_{out}$, the $BLER_{in}$ and $BLER_{out}$ may be determined with configuration #0 in the following Table 19 as a default.

TABLE 19

| Configuration | $BLER_{out}$ | $BLER_{in}$ |
|---|---|---|
| 0 | 10% | 2% |

A UE may monitor maximally $X_{RLM-RS}$ same type or different types of RLM-RS resources corresponding to a carrier frequency. Table 20 shows $X_{RLM-RS}$ corresponding to the carrier frequency.

TABLE 20

| Maximum number of RLM-RS resources $X_{RLM-RS}$ | Carrier frequency range of PCell/PSCell |
|---|---|
| 2 | FR1, ≤3 GHz |
| 4 | FR1, >3 GHz |
| 8 | FR2 |

When another SCS is used for CSI-RS-based RLM-RS and SSB, the CSI-RS-based RLM-RS and SSB should be TDM (Time Division Multiplexing)ed. When the same SCS is used for the SI-RS-based RLM-RS and SSB, the CSI-RS-based RLM-RS and SSB should undergo FDM (Frequency Division Multiplexing) or TDM. <Quasi Co-Located: QCL)>

"Quasi co-located" means the followings. For two antenna ports, for example, when the large-scale property of a radio channel to which one symbol is transmitted through one antenna port can be inferred from a radio channel to which one symbol is transmitted through another antenna port, the two antenna ports may be expressed as being quasi co-located.

Here, the large-scale property includes one or more of Doppler spread, frequency shift, average received power, and receiving timing. Hereafter, quasi co-located is briefly referred to as QCL.

That is, when two antenna ports were QCL, it means that the large-scale property of a radio channel from one antenna port is the same as the large-scale property of a radio channel from the other antenna port. Considering a plurality of antenna ports to which a reference signal (RS) is transmitted, when antenna ports to which two different kinds of RSs are transmitted are QCL, the large-scale property of a radio channel from one kind of antenna port may be replaced with the large-scale property of a radio channel from the other kind of antenna port.

In according to the concept of QCL, a UE cannot assume the same large-scale property between radio channels from corresponding antenna ports for non-QCL antenna ports. That is, in this case, the UE should perform independent processing for each of configured non-QCL antenna ports for timing acquiring, tracking, frequency offset estimating and compensating, delay estimating, Doppler estimating, etc.

For antenna ports that can be assumed as being QCL, the UE may perform the following operation:

For delay spread and Doppler spread, the UE may apply power-delay-profile, delay spread, and Doppler spread estimation results for a radio channel from any one antenna port to a Wiener filter, which is used for channel estimation for a channel for a radio channel from another antenna port, in the same way.

For frequency shift and received timing, the UE may perform tracking time and frequency synchronization for any one antenna port and then apply the same synchronization for demodulation of another antenna port.

For average received power, the UE may average RSRP (Reference Signal Received Power) for two or more antenna ports.

In 5G NR, a UE may receive maximally M TCI (Transmission Configuration Indicator)-states (TCI-state) to decode PDSCH through upper layer signaling in accordance with the PDCCH detected with DCI for the UE and a serving cell. Here, M depends on the ability of the UE. Each configured TCI state may include one RS set TCI-RS-SetConfig. Each TCI-RS-SetConfig includes a parameter that determines the QCL relationship between RS in an RS set and a DM-RS port group of PDSCH.

The RS set includes reference for one or to DL RSs and an upper layer parameter QCL-Type for a relevant QLC-type for each of the DL RSs. The QCL-type should not be the same for the two DL RSs regardless of whether the reference is for the same DL SSs or for different DL SSs.

QCL-types are informed to the UE by the Upper layer parameter QCL-type and a QCL-type may be one of or a combination of the following types:

QCL-TypeA: {Doppler shift, Doppler spread, average delay, delay spread}
QCL-TypeB: {Doppler shift, Doppler spread}
QCL-TypeC: {Doppler shift, average delay}
QCL-TypeD: {spatial Rx parameter}

Problems to be Solved Through the Present Disclosure

Figure 10:
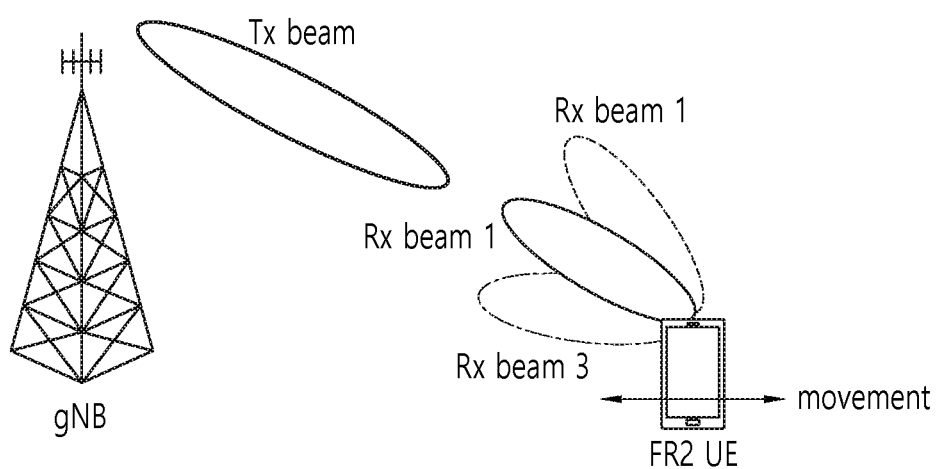
FIG. 10 is an exemplary diagram illustrating a situation in which a best reception beam is changed due to movement of a UE.

FIG. 10 is an Exemplary Diagram Illustrating a Situation in which a Best Reception Beam is Changed Due to Movement of a UE.

A UE that operates in an FR2 band performs radio link monitoring (RLM) using a plurality of reception beams. In the FR2 band, the maximum number of RLM-RS resources is 8, so the UE may monitor maximally 8 RLM-RSs.

When mobility of the UE is not considered in CONNECTED MODE, the UE may monitor RLM using only one received (or reception) beam (Rx beam) paired with a gNB (next generation NodeB) transmitted (or transmission) beam (Tx beam).

However, as illustrated in FIG. 10, an Rx beams 1 to 3 may be changed in accordance with movement of the UE even if the paired Tx beams are the same. For example, When a received beam paired with the transmitted beam of the gNB is the Rx beam 1, the best reception beam may be the Rx beam 2 when the UE moves left, and the best reception beam may be the Rx beam 3 when the UE moves right.

Meanwhile, the UE performs RLM measurement, based on measurement requirement (or RLM requirement) related to the RLM, but in the measurement requirement of the related art, the number of the reception beams of the UE and beam sweeping were not considered. Accordingly, according to the measurement requirement of the related art, there is a problem that the UE may not efficiently perform RLM measurement.

Accordingly, the number of the reception beams of the UE and beam sweeping need to be considered in the RLM requirement for efficient RLM measurement considering mobility of the UE.

<Disclosure of the Present Specification>

Disclosures of the present specification may be implemented as a combination of one or more plan/operation/configuration/step of the followings. Further, disclosures and proposes that are described hereafter are classified into items for the convenience of description. Each of the disclosures and proposes may be independently performed or may be implemented in combination with other disclosures and proposes.

Measurement requirement related to RLM includes an evaluation period that is used to evaluate the quality of downlink radio link. Here, the evaluation period may include $T_{Evaluate\_in}$ and $T_{Evaluate\_out}$. In SSB-based RLM, the $T_{Evaluate\_in}$ and $T_{Evaluate\_out}$ may be expressed as $T_{Evaluate\_in}$ SSB and $T_{Evaluate\_out}$ SSB.

In SSB-based RLM, the UE may estimate the quality of the downlink radio link of an RLM-RS resource during $T_{Evaluate\_out}$ and may determine whether the estimated quality of the downlink radio link is worse than a threshold value $Q_{out\_SSB}$ in the evaluation period $T_{Evaluate\_out}$.

The UE may estimate the quality of the downlink radio link of the RLM-RS resource during $T_{Evaluate\_in}$ and may determine whether the estimated quality of the downlink radio link is worse than a threshold value $Q_{out\_SSB}$ in the evaluation period $T_{Evaluate\_in}$.

The $T_{Evaluate\_in}$ and $T_{Evaluate\_out}$ in an FR1 band, for example, may be defined as in Table 21 or Table 22. For reference, Table 21 and Table 22 are only examples and $T_{Evaluate\_in}$ and $T_{Evaluate\_out}$ may be defined as other values.

TABLE 21

| Configuration | $T_{Evaluate\_out}$ (ms) | $T_{Evaluate\_in}$ (ms) |
|---|---|---|
| DRX is not configured | max(200, 10*$T_{SSB}$) | max(100, 5*$T_{SSB}$) |
| DRX cycle ≤320 ms | max(200, [15]*max($T_{DRX}$, $T_{SSB}$)) | max(100, [8] *max($T_{DRX}$, $T_{SSB}$)) |

TABLE 21-continued

| Configuration | $T_{Evaluate\_out}$ (ms) | $T_{Evaluate\_in}$ (ms) |
| --- | --- | --- |
| DRX cycle >320 ms | max(200, [10]*max($T_{DRX}$, $T_{SSB}$)) | max(200, [5]*max($T_{DRX}$, $T_{SSB}$)) |

TABLE 22

| Configuration | $T_{Evaluate\_out}$ (ms) | $T_{Evaluate\_in}$ (ms) |
| --- | --- | --- |
| DRX is not configured | max(200, ceil(10*P)*$T_{SSB}$) | max(100, ceil(5*P)*$T_{SSB}$) |
| DRX cycle ≤320 ms | max(200, ceil(15*P)*max($T_{DRX}$, $T_{SSB}$)) | max(100, ceil(7.5*P)*max($T_{DRX}$, $T_{SSB}$)) |
| DRX cycle >320 ms | ceil(10*P)*$T_{DRX}$ | ceil(5*P)*$T_{DRX}$ |

DRX means discontinuous reception. $T_{SSB}$ may be the cycle of an SSB configured for RLM. $T_{DRX}$ may be the length of the DRX cycle. ceil means a ceiling function. P may be defined as follows.

When a measurement gap for intra-frequency measurement in a cell that is monitored, a measurement gap for inter-frequency measurement, or a measurement gap for inter-RAT measurement partially overlap an SSB (occasion of an SSB): P=1/(1−$T_{SSB}$/MGRP)

When a measurement gap does not overlap SSB in a cell that is monitored: P=1

Since the UE may not perform a beam sweeping operation in an FR1 band, the number of reception beams does not need to be considered. However, in an FR2 band, as described above, the number of reception beams needs to be considered.

Considering the number of reception beams of the UE, $T_{Evaluate\_in}$ and $T_{Evaluate\_out}$ in the FR2 band, for example, may be defined as in Table 23. For reference, Table 23 is only an example, and the $T_{Evaluate\_in}$ and $T_{Evaluate\_out}$ may be defined as other values.

TABLE 23

| Configuration | $T_{Evaluate\_out}$ (ms) | $T_{Evaluate\_in}$ (ms) |
| --- | --- | --- |
| DRX not configured | max(200, N*[10]*$T_{SSB}$) | max(100, N*[5]*$T_{SSB}$) |
| DRX cycle ≤320 ms | max(200, N*[15]*max($T_{DRX}$, $T_{SSB}$)) | max(100, N*[8] *max($T_{DRX}$, $T_{SSB}$)) |
| DRX cycle >320 ms | max(200, N*[10]*max($T_{DRX}$, $T_{SSB}$)) | max(200, N*[5]*max($T_{DRX}$, $T_{SSB}$)) |

Table 23 is a first example of RLM measurement requirement considering the number of reception beams. Here, N is the number of reception beams.

Meanwhile, according to Table 23, an evaluation period may be a value that is too large to monitor a downlink quality, depending on the N value and the cycle of the RLM-RS. This is because when the value of the evaluation period is too large, the result of monitoring the radio link quality may be a meaningless result. Since the number of the reception beam, N, is an implementation issue, it has a different value for each UE, but may be generally 8. For example, when N=8 and the RLM-RS cycle is large, there is a defect that the RLM requirement may be meaningless.

Accordingly, in order to define appropriate RLM requirement, the N value may be defined as a small value such as 2 and 3 in consideration of the number of reception beams. That is, it may be possible to define the RLM measurement requirement in consideration of the number M of best beams of the number N of all reception beams. In order to select M best beams, a CSI-RS repetition mode for beam management may be used for RLM. In order to configure CSI-RS repetition for RLM, an RLM-RS (SSB or CSI-RS resource) may be QCL with a CSI-RS resource.

Figure 11:
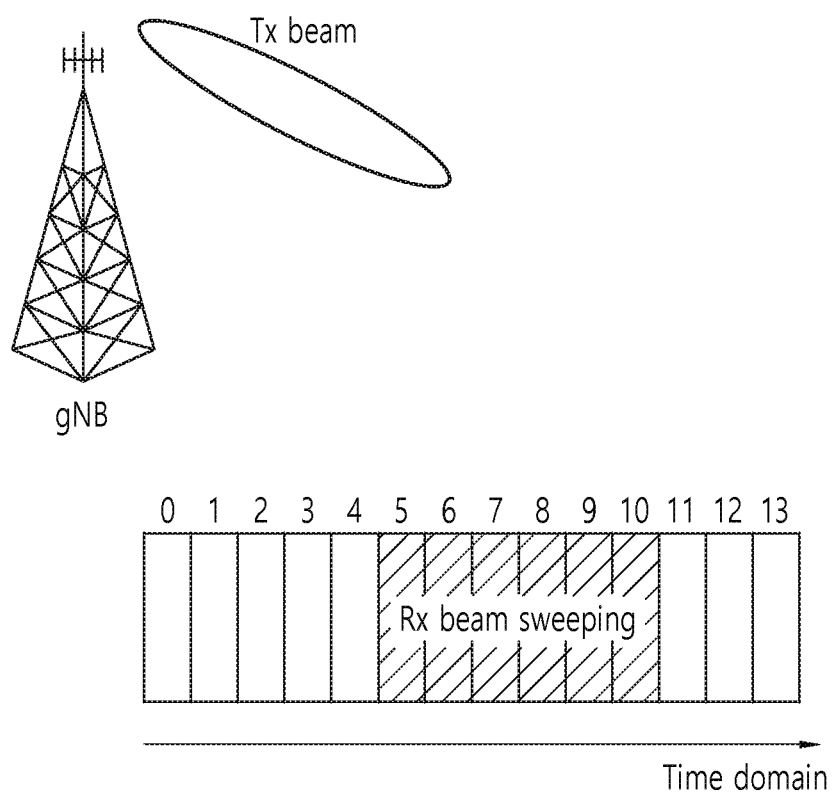
FIG. 11 is an exemplary diagram illustrating a CSI-RS repetition mode.

FIG. 11 is an Exemplary Diagram Illustrating a CSI-RS Repetition Mode.

Referring to FIG. 11, a gNB may turn "ON" the CSI-RS repetition mode. Accordingly, the gNB may repeatedly transmit the same CSI-RS. The UE may measure RSRP of the CSI-RS by performing a reception beam sweeping operation on the repeatedly transmitted CSI-RS. The UE may determine reception beams of which the measured RSRP values are large as M best beams. In this case, the UE may store beam indexes of the M best beams, and may perform RLM measurement using the M best beams, based on the beam indexes. The gNB may configure the cycle of CSI-RS repetition, based on an RLM-RS cycle.

Considering the number of the M reception beams, $T_{Evaluate\_in}$ and $T_{Evaluate\_out}$, for example, may be defined in an FR2 band as in Table 24. For reference, Table 24 is only an example, and $T_{Evaluate\_in}$ and $T_{Evaluate\_out}$ may be defined as different values.

TABLE 24

| Configuration | $T_{Evaluate\_out}$ (ms) | $T_{Evaluate\_in}$ (ms) |
| --- | --- | --- |
| DRX is not configured | max(200, M*[10]*$T_{SSB}$) | max(100, M*[5]*$T_{SSB}$) |
| DRX cycle ≤320 ms | max(200, M*[15]*max($T_{DRX}$, $T_{SSB}$)) | max(100, M*[8] *max($T_{DRX}$, $T_{SSB}$)) |
| DRX cycle >320 ms | max(200, M*[10]*max($T_{DRX}$, $T_{SSB}$)) | max(200, M*[5]*max($T_{DRX}$, $T_{SSB}$)) |

Figure 12:
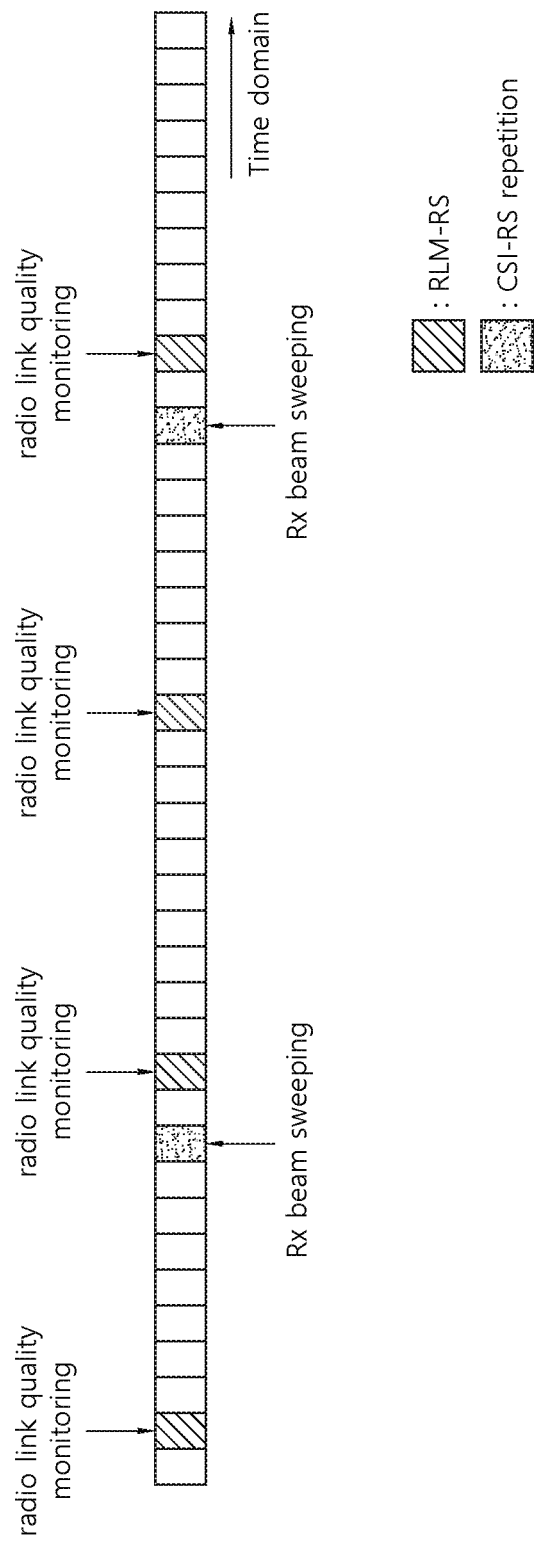
FIG. 12 is an exemplary diagram illustrating a first example of configuring an RLM-RS and a CSI-RS.

Table 24 is a second example of the RLM measurement requirement considering the number of reception beams. In Table 24, the M value may be the number of best reception beams. M, for example, may be 2 or 3. FIG. 12 is an exemplary diagram illustrating a first example of configuring RLM-RS and CSI-RS.

Describing an example of configuring RLM-RS and CSI-RS with reference to FIG. 12, a gNB may configure the repetition cycle of CSI-RS double to RML-RS transmission cycle. The UE may measure RSRP of the CSI-RS by performing a reception beam sweeping operation for the CSI-RS. The UE may determine the reception beams, of which the measured RSRP values are large, as M best beams. Further, the UE may monitor the radio link quality by performing a beam sweeping operation using the M best beams.

Describing by exemplifying a case in which the total number of reception beams of the UE is 8 and M in Table 24 is 3, the UE may determine 3 reception beams (e.g., Rx beams 1, 3, and 7) having large RSRP in accordance with the result of measuring RSRP for the CSI-RS. The UE may perform RLM measurement by performing a beam sweeping operation using the Rx beams 1, 3, and 7 for the evaluation period of Table 24.

Figure 13:
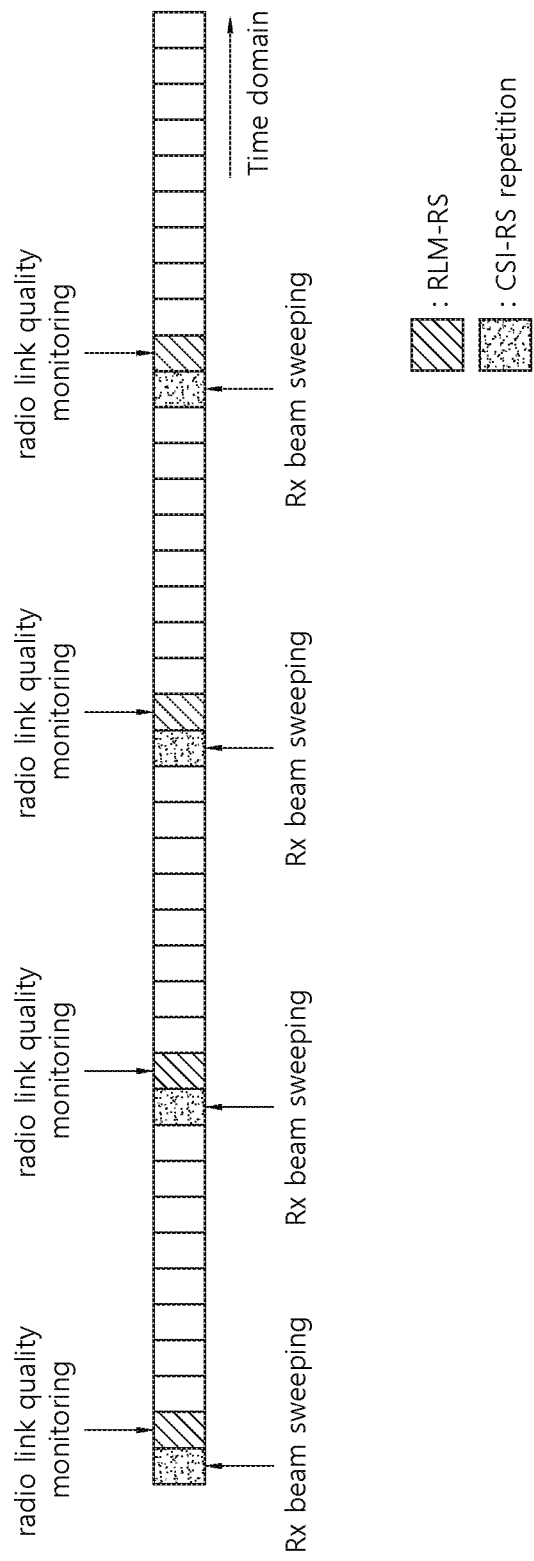
FIG. 13 is an exemplary diagram illustrating a second example of configuring an RLM-RS and a CSI-RS.

FIG. 13 is an Exemplary Diagram Illustrating a Second Example of Configuring RLM-RS and CSI-RS.

When DRX is configured for the UE and when RLM-RS is transmitted after CSI-RS is repeatedly transmitted with intervals, as in FIG. 12, it is required to perform RLM measurement while changing from an ON state to an OFF state and the changing from the OFF state back to the ON state after the UE measures the RSRP.

Accordingly, in order to reduce power consumption when DRX is configured for the UE, the gNB may configure repetition of the CSI-RS is transmitted right before the RLM-RS, as in FIG. 13. Accordingly, the UE may perform RLM measurement by maintaining the ON state without changing to the OFF state after measuring RSRP for the CSI-RS.

Accordingly, it is possible to update the RLM configuration to consider the CSI-RS repetition mode described with reference to FIGS. 11 to 13. For example, the RLM configuration RadioLinkMonitoringConfig (see 3GPP TS 38.331) that is provided from the gNB to the UE may be updated to include information related to the CSI-RS. For example, the information related to the CSI-RS may be defined as RadioLinkMonitoring-NZP-CSI-RS-ResourceSet in Table 25.

TABLE 25

```
RadioLinkMonitoring-NZP-CSI-RS-ResourceSet ::=        SEQUENCE {
nzp-CSI-ResourceSetId           NZP-CSI-RS-ResourceSetId,
nzp-CSI-RS-Resources            SEQUENCE  (SIZE  (1..maxNrofNZP-CSI-RS-
ResourcesPerSet)) OF NZP-CSI-RS-ResourceId,
repetition                      ENUMERATED { on }
periodicity                     ENUMERATED { ms5, ms10, ms20, ms40 }
    associatedSSB
ssb-Index                       SSB-Index,
isQuasiColocated                BOOLEAN
}
```

In Table 25, nzp-CSI-ResourceSetId may be the ID of a set of NZP-CSI-RS resources. nzp-CSI-RS-Resources may be NZP-CSI-RS resources in the set of NZP-CSI-RS resources. maxNrofNZP-CSI-RS-ResourcesPerSet may be the maximum number of the NZP-CSI-RS resources in the set of NZP-CSI-RS resources. repetition mean whether NZP-CSI-RS is repeatedly transmitted. periodicity means the transmission cycle of NZP-CSI-RS. associatedSSB is an SSB related to NZP-CSI-RS. ssb-Index may be the index of the SSB related to NZP-CSI-RS. isQuasiColocated means that the SSB related to NZP-CSI-RS is QCL. RadioLink-Monitoring-NZP-CSI-RS-ResourceSet may be included in RadioLinkMonitoringConfig in Table 25. Table 26 is an example of RadioLinkMonitoringConfig Description of RadioLinkMonitoringConfig and RadioLinkMonitoringRS is omitted.

TABLE 26

```
ASN1START
TAG-RADIOLINKMONITORINGCONFIG-START
RadioLinkMonitoringConfig ::=                     SEQUENCE {
failureDetectionResources       SEQUENCE
(SIZE(1..maxNrofFailureDetectionResources))   OF  RadioLinkMonitoringRS
    OPTIONAL,
beamFailureInstanceMaxCount     ENUMERATED {n1, n2, n3, n4, n5, n6, n8, n10}
beamFailureDetectionTimer       ENUMERATED {pbfd1, pbfd2, pbfd3, pbfd4, pbfd5,
pbfd6, pbfd8, pbfd10}           OPTIONAL,
...
}
RadioLinkMonitoringRS ::=                         SEQUENCE {
purpose                         ENUMERATED {beamFailure, rlf, both},
detectionResource               CHOICE {
ssb-Index                       SSB-Index,
csi-RS-Index                    NZP-CSI-RS-ResourceId
},
...
}
RadioLinkMonitoring-NZP-CSI-RS-ResourceSet ::=        SEQUENCE {
nzp-CSI-ResourceSetId           NZP-CSI-RS-ResourceSetId,
nzp-CSI-RS-Resources            SEQUENCE  (SIZE  (1...maxNrofNZP-CSI-RS-
ResourcesPerSet)) OF NZP-CSI-RS-ResourceId,
repetition                      ENUMERATED { on }
periodicity                     ENUMERATED { ms5, ms10, ms20, ms40 }
    associatedSSB
ssb-Index                       SSB-Index,
isQuasiColocated                BOOLEAN
}
TAG-RADIOLINKMONITORINGCONFIG-STOP
-- ASN1STOP
```

FIG. 14 is a Flowchart Illustrating a First Example in which a UE Performs RLM Measurement.

An example of RLM measurement using the CSI-RS repetition mode is described with reference to FIG. 14.

The UE may receive information about a CSI-RS resource. In detail, the gNB, as exemplified in FIG. 12 or 13, may turn on the CSI-RS repetition mode and may transmit the information about the CSI-RS resource (e.g., RadioLink-Monitoring-NZP-CSI-RS-ResourceSet in Table 24) to the UE.

Accordingly, the UE may measure RSRP of the CSI-RS repeatedly transmitted, by performing reception beam sweeping. Since the UE measure RSRP of each CSI-RS for a plurality of reception beams, the measured RSRP values may depend on the reception beams.

The UE may determine M best reception beams. In detail, the UE may determine M reception beams having large RSRP values, based on the measured RSRP values. In this case, the UE may also discriminate the indexes of the M reception beams.

The UE may monitor the radio link quality using the determined M reception beams. In detail, the UE may perform a beam sweeping operation for RLM-RS using the determined M reception beam and may monitor the radio link quality during the evaluation period of Table 24.

The above is description of FIG. 14. Hereafter, another example of defining RLM requirement in consideration of reception beams is described.

Configurations for RSs for various purposes such as beam management, RLM, and beam failure detection exist in NR. Such RSs are independently configured by a network.

Meanwhile, a CSI-RS for beam management, an RS for RLM, and an RS for beam failure detection may be QCL with an SSB, so the UE may determine best reception beams using the RSs for RLM evaluation (i.e., RLM measurement).

In other words, when RLM-RSs are not RSs for beam management or a portion of RSs for beam failure detection, or are not QCL, the UE should perform a beam sweeping operation to find out best reception beams, so additional delay may be required for RLM measurement.

Accordingly, in order to define an evaluation period for RLM regardless of reception beam sweeping in an FR 2 band, (i.e., in order for the UE to perform RLM measurement without performing the reception beam sweeping operation), 1) the RLM-RS may be a portion of the RSs for another purpose (beam management or beam failure detection) or 2) the RLM-RS may be QCL with the RSs.

For example, a network (e.g., a gNB) may configure all RLM-RSs to be a portion of RSs for beam management or RSs for beam failure detection (another RS configuration may be included). For example, a gNB may configure four RLM-RSs based on an SSB corresponding to ssb-index {0, 1, 2, 3} of RadioLinkMonitoringRS in Table 18 and may configure ssb of BFR-SSB-Resource in Table 27 as {0,1,2,3,4,5,6,7}.

TABLE 27

| BFR-SSB-Resource ::= | SEQUENCE { |
| --- | --- |
| ssb | SSB-Index, |
| ra-PreambleIndex | INTEGER (0..63), |
| ... | |
| } | |

For reference, Table 27 is an example of information related to beam failure recovery (BFR), BFR-SSB-Resource. In Table 27, ssb is the ID of an SSB transmitted by a serving cell and ssb determines a candidate beam for BFR. ra-PreambleIndex is used to perform BFR when the UE selects a candidate beam identified by ssb. 2) As another example, a network (e.g., gNB) may configure all RLM-RS to be QCL with RSs for beam management or RSs for beam failure detection (another RS configuration may be included). For example, the gNB may configure four RLM-RSs based on an SSB corresponding to ssb-index {0, 1, 2, 3} of RadioLinkMonitoringRS in Table 18, may configure ssb-index also as {0, 1, 2, 3} in associatedSSB of CSI-RS-Resource-Mobility in Table 28, and may configure isQuasiColocated as {1}.

TABLE 28

| CSI-RS-Resource-Mobility ::= | SEQUENCE { |
| --- | --- |
| csi-RS-Index | CSI-RS-Index, |
| slotConfig | CHOICE { |
| ms4 | INTEGER (0..31), |
| ms5 | INTEGER (0..39), |
| ms10 | INTEGER (0..79), |
| ms20 | INTEGER (0..159), |
| ms40 | INTEGER (0..319) |
| }, | |
| associatedSSB | SEQUENCE { |
| ssb-Index | SSB-Index, |
| isQuasiColocated | BOOLEAN |
| } | |

Table 28 shows information about CSI-RS resources. slotConfig includes a periodic/semi-persistent cycle of the CSI-RS and slot offset. associatedSSB is information about an SSB related to the CSI-RS. Each CSI-RS resource may be associated with one SSB. A network may provide information about the SSB related to the CSI-RS resources to the UE using associatedSSB. ssb-index is the index of the SSB related to the CSI-RS. isQuasiColoacted means that the CSI-RS resources are QCL with the relevant SSB or are not QCL at a spatial parameter. Accordingly, when a network 1) configures an RLM-RS to be a portion of RSs for another purpose (beam management or beam failure detection RS) or 2) configures an RLM-RS to be QCL with the RSs, the UE may determine best reception beams for RLM without using an additional resource. That is, in this case, even if the UE uses a plurality of reception beams, it is possible to define RLM requirement without considering the number of the reception beams of the UE.

For example, $T_{Evaluate\_in}$ and $T_{Evaluate\_out}$ in an FR2 band may be defined as in Table 29. For reference, Table 29 is only an example and $T_{Evaluate\_in}$ and $T_{Evaluate\_out}$ may be defined as other values. In Table 29, 1) when the RLM-RS is a portion of RSs for another purpose or 2) when the RLM-RS is QCL with the RSs for another purpose, N may be 1.

TABLE 29

| Configuration | $T_{Evaluate\_out}$ (ms) | $T_{Evaluate\_in}$ (ms) |
| --- | --- | --- |
| DRX is not configured | max(200, ceil(10*P*N)*$T_{SSB}$) | max(100, ceil(5*P*M*$T_{SSB}$) |
| DRX cycle ≤320 ms | max(200, ceil(15*P*N)*max($T_{DRX}$, $T_{SSB}$)) | max(100, ceil(7.5*P*N)*max($T_{DRX}$, $T_{SSB}$)) |
| DRX cycle >320 ms | ceil(10*P*N)*$T_{DRX}$ | ceil(5*P*N)*$T_{DRX}$ |

Table 29 is a third example of the RLM measurement requirement considering the number of reception beams. N is as follows.

1) When an SSB configured for RLM is QCL with a CSI-RS resource and QCL association is known to the UE (e.g., an SSB configured for RLM is QCL-type D with a CSI-RS configured for L1-RSRP reporting, and is TDMed), or 2) when an SSB configured for RLM is not included in an SSB for BFR: N=1

Other cases: N=8 or N=M (M may be a value described with reference to FIGS. 11 and 12 and the range of the M value may be a value larger than 1 and smaller than 8)

P in Table 22 is as follows.

When an RLM-RS does not overlap a measurement gap and the RLM-RS partially overlap SMTC occasion ($T_{SSB} < T_{SMTCperiod}$): $P=1/(1-T_{SSB}/T_{SMTCperiod})$ When an RLM-RS does not overlap a measurement gap and the RLM-RS fully overlap an SMTC period ($T_{SSB}=T_{SMTCperiod}$): $P=3$ When an RLM-RS partially overlaps a measurement gap and partially overlaps SMTC occasion ($T_{SSB} < T_{SMTCperiod}$), ii) When the SMTC occasion does not overlap a measurement gap, and iii) $T_{SMTCperiod} \neq MGRP$ or $T_{SMTCperiod} = MGRP$ and $T_{SSB} < 0.5 * T_{SMTCperiod}$: $P=1/(1-T_{SSB}/MGRP-T_{SSB}/T_{SMTCperiod})$ When an RLM-RS partially overlaps a measurement gap, the RLM-RS partially overlaps SMTC occasion ($T_{SSB} < T_{SMTCperiod}$), the SMTC occasion does not overlap the measurement gap, and $T_{SMTCperiod}=MGRP$ and $T_{SSB}=0.5*T_{SMTCperiod}$: $P=1/(1-T_{SSB}/MGRP)*3$ When an RLM-RS partially overlaps a measurement gap, the RLM-RS partially overlaps SMTC occasion ($T_{SSB} < T_{SMTCperiod}$), and the SMTC occasion partially or fully overlaps the measurement: $P=1/\{1-T_{SSB}/\min(T_{SMTCperiod}, MGRP)\}$ When an RLM-RS partially overlaps a measurement gap, the RLM-RS fully overlaps SMTC occasion ($T_{SSB}=T_{SMTCperiod}$), and the SMTC occasion partially overlaps the measurement gap ($T_{SMTCperiod} < MGRP$): $P=1/(1-T_{SSB}/MGRP)*3$ Here, $T_{SMTCperiod}$ is the length of an SMTC period. The SMTC is SSB-based measurement timing configuration.

Figure 15:
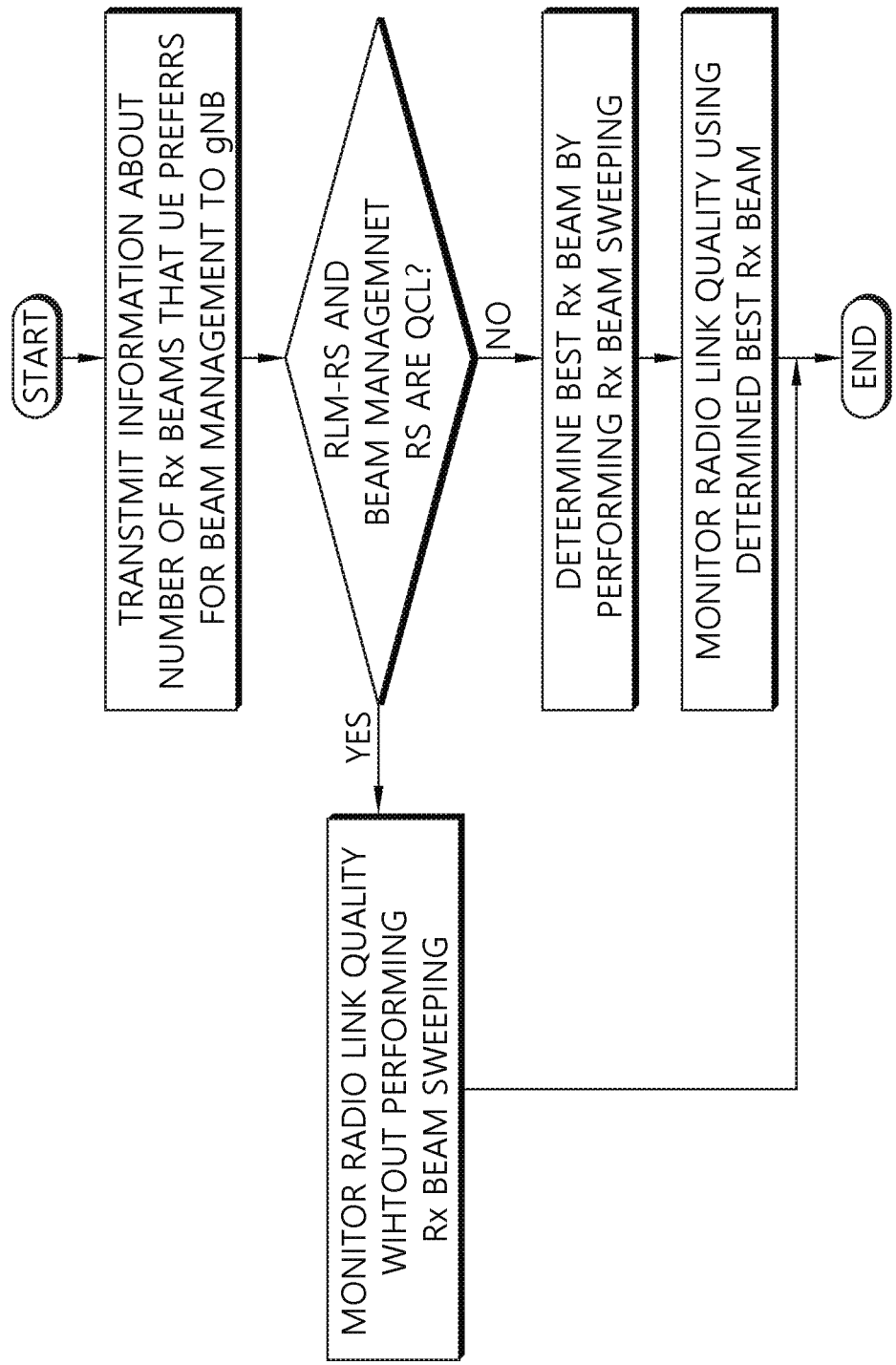
FIG. 15 is a flowchart illustrating a second example in which a UE performs RLM measurement.

FIG. 15 is a Flowchart Illustrating a Second Example in which a UE Performs RLM Measurement.

First, before describing the detailed operations in the flowchart of FIG. 15, a UE reports the number of reception beams, which the UE prefers for beam management, and RLM measurement requirement defined in consideration of the number of reception beams is described.

RLM measurement is for reporting the downlink link quality of a serving cell. Accordingly, a reception beam operation for data reception/beam management may be considered in RLM measurement. Accordingly, a reception beam operation for receiving serving cell data and a reception beam operation for measurement may be the same.

For example, when a UE performs a beam sweeping operation using 8 reception beams for beam management, the UE may use 8 reception beams also for RLM measurement. That is, when there is no QCL relationship between an RLM-RS and an RS for beam management (they are not QCL), the UE should monitor the radio link quality by sweeping a plurality of reception beams. In this case, an RLM evaluation period may be defined to increase as many as the reception beams that the UE reports to a gNB (e.g., the number of reception beams that are used for beam management). For example, the number of reception beams the UE reports may be maxNumberRxBeam in Table 30. maxNumberRxBeam may be the number of reception beams that the UE prefers when the UE performs beam management. The UE may transmit maxNumberRxBeam when reporting the UE ability to the gNB.

TABLE 30

| maxNumberRxBeam INTEGER (2..8) | It relates to whether the UE supports reception beamforming switching using an NZP (non zero power) CSI-RS resource. The UE may indicate the preferred number of NZP CSI-RS resource repetition per CSI-RS resource set as a single value. |
|---|---|

The UE may transmit single values from 2 to 8 to the gNB as the number of reception beams that are used for beam management, as exemplified in Table 30. Accordingly, the UE may use the same number of reception beams as the number of reception beams transmitted to the gNB for RLM measurement. Accordingly, when an RLM-RS and a beam management RS are not QCL, N in Table 29 may be maxNumberRxBeam. That is, the value of the evaluation period defined in Table 29 may be determined, based on "the number of reception beams that the UE prefers for beam management" transmitted to the gNB.

The flowchart of FIG. 15 is described, based on the operation of the UE described above in the specification.

Referring to FIG. 15, a UE may transmit the information about the number of reception beams, which the user prefers for beam management, to a gNB. For example, the UE may transmit maxNumberRxBeam to the gNB. For reference, the step of transmitting the information about the number of reception beams that the UE prefers may be omitted.

The UE determines whether the RLM-RS and the RS for beam management are QCL. In detail, the UE may receive the information about whether the RS for beam management is QCL with the RLM-RS from the gNB. For example, the UE may receive the information about an SSB related to a CSI-RS transmitted from the gNB and the information about the related SSB is QCL from the gNB. Accordingly, the UE may determine whether the RS for beam management is QCL with the RLM-RS, based on the information received from the gNB.

When the RLM-RS and the RS for beam management are QCL, the UE may monitor the radio link quality without performing reception beam sweeping. For example, in this case, the N values of the evaluation periods $T_{Evaluate\_in}$ and $T_{Evaluate\_out}$ described in the example of Table 29 may be 1. The UE may perform RLM measurement on the RLM-RS during $T_{Evaluate\_in}$ and $T_{Evaluate\_out}$ in which N=1 in Table 29. As another example, the UE may perform RLM measurement for $T_{Evaluate\_in}$ and $T_{Evaluate\_out}$ in which N=M in Table 29.

When the RLM-RS and the RS for beam management are not QCL, the UE may determine best reception beams by performing a beam sweeping operation based on a plurality of reception beams. For example, the UE may measure RSRP by performing a beam sweeping operation on the CSI-RS repeatedly received. The UE may determine M best reception beams, based on the measured RSRP. As another example, the UE may configure the number of reception beam for monitoring the radio link quality, based on the number of reception beams, that the UE prefers, transmitted to the gNB.

The UE may monitor the radio link quality using the determined best reception beams. For example, the UE may perform RLM measurement during the evaluation period in which N=8 in Table 29. As another example, the UE may measure RLM measurement during the evaluation period in which N=maxNumberRxBeam in Table 29.

Figure 16:
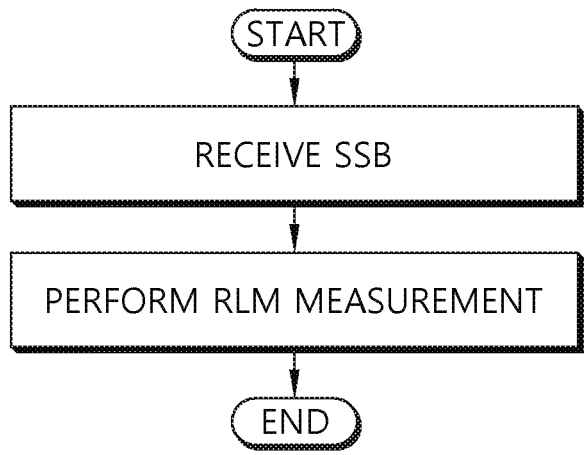
FIG. 16 is a flowchart illustrating the operation of a UE according to the present disclosure.

FIG. 16 is a Flowchart Illustrating an Operation of a UE According to Disclosure of the Specification.

The flowchart of FIG. 16 is described, based on the operation of the UE described above in the specification.

A UE may receive an SSB from a serving cell. Here, the SSB may be used for RLM. The UE may also receive an CSI-RS resource from the serving cell. The UE may also receive the information about whether the SSB from the serving cell is QCL with the CSI-RS resource.

The UE may perform RLM measurement. In detail, the UE may perform RLM measurement, based on an RLM-RS included in an SSB. When the SSB is QCL with the CSI-RS, the UE may perform RLM measurement during a first evaluation period based on a first value. When the SSB is not QCL with the CSI-RS, the UE may perform RLM measurement during a second evaluation period based on a second value. Here, the first evaluation period may be smaller than the second evaluation period. For example, the first evaluation period based on the first value may be $T_{Evaluate\_in}$ and $T_{Evaluate\_out}$ in which N=1 in Table 29. Alternately, the first evaluation period based on the first value may be $T_{Evaluate\_in}$ and $T_{Evaluate\_out}$ in which N=M in Table 29. Further, the second evaluation period based on the second value may be $T_{Evaluate\_in}$ and $T_{Evaluate\_out}$ in which N=8 in Table 29. Alternately, the second evaluation period based on the second value may be $T_{Evaluate\_in}$ and $T_{Evaluate\_out}$ in which N=maxNumberRxBeam in Table 29.

Figure 17:
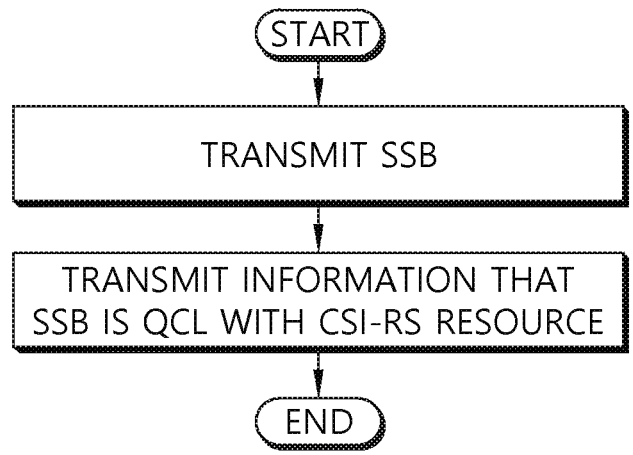
FIG. 17 is a flowchart illustrating the operation of a base station according to the present disclosure.

FIG. 17 is a Flowchart Illustrating the Operation of a Base Station According to Disclosure of the Specification.

The flowchart of FIG. 17 is described, based on the operation of the base station described above in the specification.

A base station (e.g., a gNB) may transmit an SSB to a UE. The SSB may be used for RLM and the SSB may include an RLM-RS. The base station may transmit a CSI-RS resource to the UE.

The base station may transmit the information that the SSB is QCL with the CSI-RS resource. The information that the SSB is QCL with the CSI-RS resource may be used for the UE to perform RLM measurement based on the RLM-RS. In detail, the UE performs RLM measurement in the first evaluation period based on the first value or the second evaluation period based on the second value, depending on whether the SSB is QCL with the CSI-RS resource. That is, the information that the SSB is QCL with the CSI-RS resource is used for the UE to determine an evaluation period related to RLM measurement.

Figure 18:
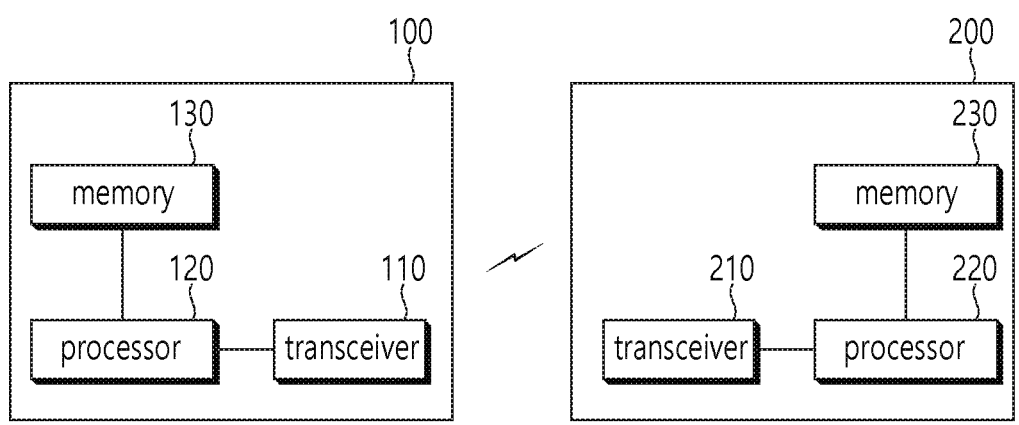
FIG. 18 is a block diagram illustrating a UE or a network node in which the present disclosure is implemented.

FIG. 18 is a Block Diagram Showing a UE and a Network Node in which a Disclosure of this Specification is Implemented.

Referring to FIG. 18, a UE (100) and a network node (200) may implement the disclosure of this specification. The UE (100) may be the UE that is described in the disclosure of this specification. And, the network node (200) may be SMF 1, SMF 2, AMF, first UPF, and second UPF that are described in the disclosure of this specification.

As shown in the drawing, the UE (100) includes a processor (120), a memory (130), and a transceiver (110). Similarly, as shown in the drawing, the base station (200) includes a processor (220), a memory (230), and a transceiver (210). The processors (120, 220), the memories (130, 230), and the transceivers (110, 210) may each be implemented as a separate chip or at least two or more blocks/functions may be implemented by a single chip.

The transceiver (110, 210) includes a transmitter and a receiver. In case a specific operation is being performed, any one of the transmitter and the receiver may be operated, or both the transmitter and the receiver may be operated. The transceiver (110, 210) may include one or more antennas transmitting and/or receiving radio signals. Additionally, the transceiver (110, 210) may include an amplifier that is used for amplifying a reception signal and/or a transmission signal, and a band-pass filter that is used for performing transmission to a specific frequency band.

The processor (120, 220) may implement the functions, processes, and/or methods that are proposed in this specification. The processor (120, 220) may include an encoder and a decoder. For example, the processor (120, 220) may perform the operations according to the description presented above. The above-described processor (120, 220) may include an application-specific integrated circuit (ASIC), another chip set, a logical circuit, a data processing device, and/or a converter converting a baseband signal and a radio signal to and from one another.

The memory (130, 230) may include a read-only memory (ROM), a random access memory (RAM), a flash memory, a memory card, a storage medium, and/or another storage device.

Figure 19:
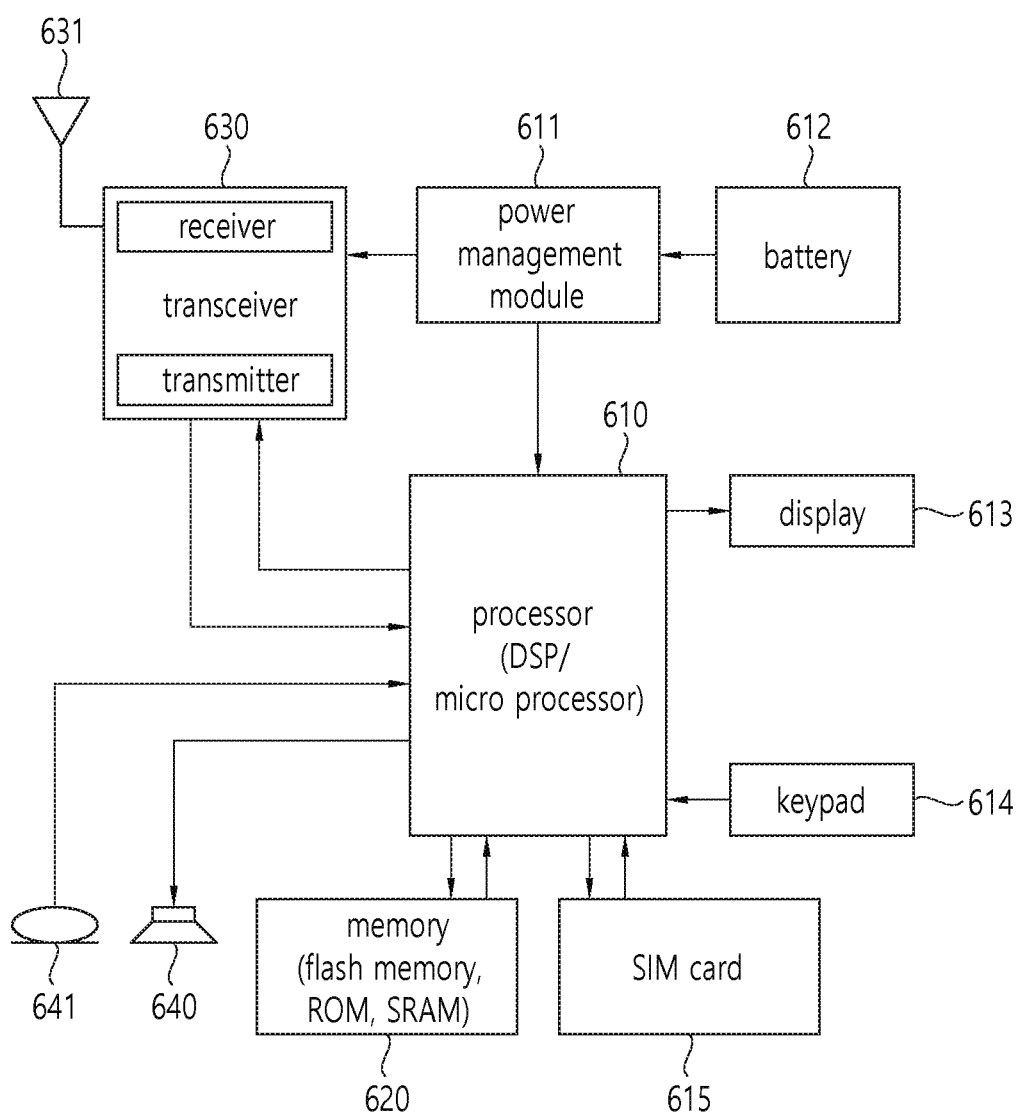
FIG. 19 is a detailed block diagram illustrating in detail a UE or a network node in which the present disclosure is implemented.

FIG. 19 is a Detailed Block Diagram Illustrating a UE or a Network Node in which a Disclosure of this Specification is Implemented.

A device illustrated in FIG. 19 means the UE 100 or the network node 200 of FIG. 18. The device includes a processor 610, a memory 620, and a transceiver 630.

Specifically, the processor 610 may be the processor 120 of the UE 100 or the processor 220 of the network node 200. The memory 620 may be the memory 130 of the UE 100 or the memory 230 of the network node 200. The transceiver 630 may be the transceiver 110 of the UE 100 or the transceiver 210 of the network node 200.

The processor 610 may be configured to implement a proposed function, procedure, and/or method described in this specification. Layers of a radio interface protocol may be implemented by the processor 610.

More specifically, if the processor 610 is the processor 120 of the UE 100, when a preconfigured condition related to the LADN policy is satisfied, the processor 610 may be configured to transmit a message requesting the LADN policy to the AMF and receive the LADN policy provided by the PCF from the AMF, in which the LADN policy includes information related to at least one application and information related to an LADN DNN related to the at least one application; determine a LADN DNN to be used based on the LADN policy; and transmit a PDU session establishment request message related to the determined LADN DNN to the AMF.

If the processor 610 is the processor 220 of the network node 200, the processor 610 may be configured to receive a message for requesting the LADN policy from the AMF, in which the message for requesting the LADN policy is a message transmitted to the AMF by the UE; generate the LADN policy based on the message for requesting the LADN policy, in which the LADN policy includes the information related to at least one application and the information related to the LADN DNN related to the at least one application; and transmit the LADN policy to the AMF.

The memory 620 is connected with the processor 610 to be operable and stores various pieces of information for driving the processor 610. The transceiver 630 is connected with the processor 610 to be operable and transmits and/or receives a radio signal.

The processors 610 and 2021 may include an application-specific integrated circuit (ASIC), another chipset, a logic circuit, and/or a data processing apparatus. The memory 620 may include a read-only memory (ROM), a random access memory (RAM), a flash memory, a memory card, a storage medium, and/or other storage devices. The transceiver 630 may include a baseband circuit for processing a radio frequency signal. When an embodiment is implemented as software, techniques described in this specification may be implemented as modules (e.g., procedure, function, etc.) performing the functions described in this specification. The module may be stored in the memory 620 and executed by the processor 610. The memory 620 may be implemented inside the processor 610. Alternatively, the memory 620 may be implemented outside the processor 610 and connected to the processor 610 to be communicable through various means known in a technical field.

According to an embodiment of the present disclosure, which is illustrated in FIG. 14, the UE which is roaming may also receive the service using the LADN. Specifically, the UE which is roaming may establish the PDU session by using the LADN.

Figure 20:
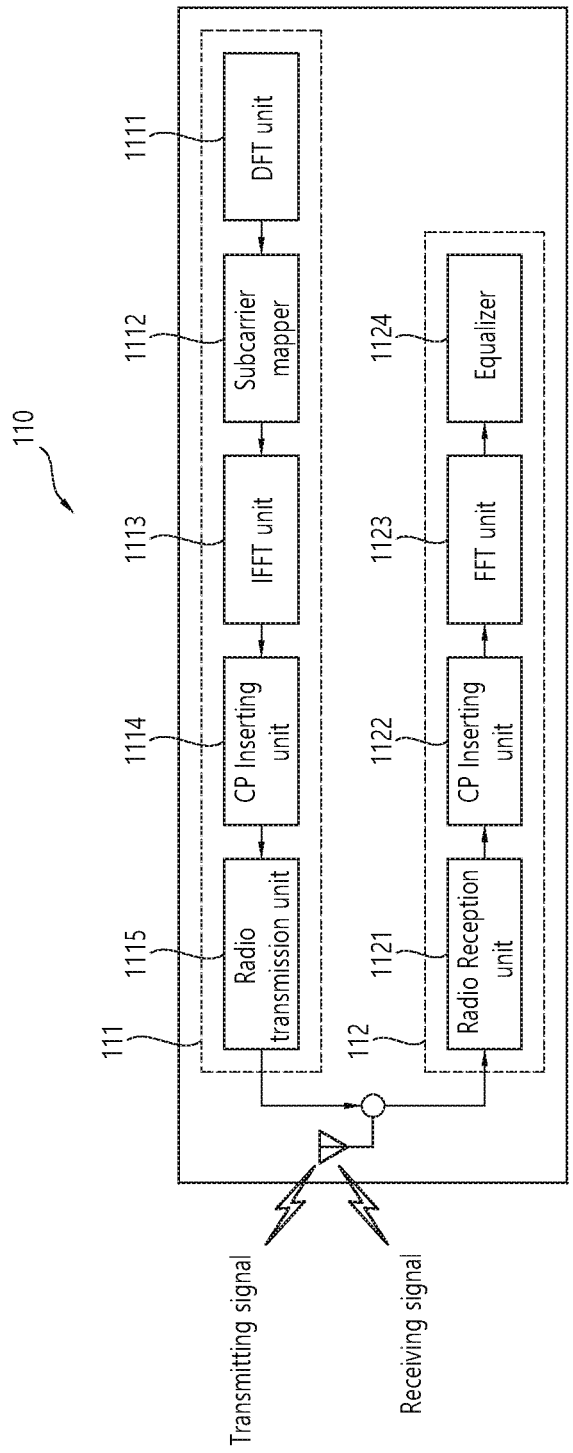
FIG. 20 is a detailed block diagram of a transceiver of the UE and the network node illustrated in FIG. 18.

FIG. 20 is a Detailed Block Diagram of the Transceiver of the UE or the Network Node Illustrated in FIG. 18.

In FIG. 20, the transceiver 110 means the transceiver 110 of FIG. 18 in the UE and transceiver 210 of FIG. 18 in the network node. Referring to FIG. 20, the transceiver 110 includes a transmitter 111 and a receiver 112. The method proposed by the present disclosure can be used in various schemes as well as in ICIC. For example, the method can be used to identify the difference between DL timings of multiple serving cells, and to maintain synchronization of each serving cell. The transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The sub carrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, and so on). The module is stored in the memory and may be executed by the processor. The memory may exist inside or outside the processor and may be connected to the processor in various known means.

In the above exemplary systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A method for performing measurement, the method performed by a user equipment (UE) and comprising:
   receiving, from a serving cell, a Channel-State Information Reference Signal_(CSI-RS) resource; and
   performing measurement based on the CSI-RS resource during a measurement period,
   wherein the measurement period is determined based on a repetition of the CSI-RS resource, and
   based on that the repetition of the CSI-RS resource is set to ON, wherein the measurement period is based on a value related to a number of receiving beams, which is indicated by a capability information transmitted to the serving cell.

2. The method of claim 1, further comprising:
   receiving an SS (Synchronization Signal)/PBCH (Physical Broadcast Channel) Block (SSB) from the serving cell; and
   performing radio link monitoring (RLM) measurement, based on an RLM-reference signal (RLM-RS) included in the SSB, during an evaluation period which is based on scaling factor 8.

3. The method of claim 2, further comprising:
   determining a predetermined number of best beams by measuring RSRP (reference signal received power) for the CSI-RS resource through a beam sweeping operation based on a plurality of receiving beams,
   wherein based on the SSB being Quasi-Co-Located (QCL) with the CSI-RS resource, the RLM measurement is performed based on the predetermined number of best beams during the evaluation period.

4. The method of claim 1, further comprising:
receiving, from the serving cell, information that the SSB is QCL with the CSI-RS resource.

5. The method of claim 2, further comprising:
based on the SSB not being QCL with the CSI-RS resource:
  determining the number of receiving beams to be used for the RLM measurement by performing a beam sweeping operation based on a plurality of beams on the SSB,
  wherein the RLM measurement is performed, based on the determined number of receiving beams.

6. The method of claim 2, wherein the CSI-RS resource is repeatedly received from the serving cell, and
wherein the method further comprises:
based on the SSB not being QCL with the CSI-RS resource:
  determining the number of receiving beams to be used for the RLM measurement by performing a receiving beam sweeping operation based on a plurality of receiving beams on the CSI-RS resource during a period in which the CSI-RS resource is repeatedly received,
  wherein the RLM measurement is performed, based on the determined number of receiving beams.

7. The method of claim 6, wherein the CSI-RS resource is repeatedly received before a period in which the SSB is transmitted.

8. The method of claim 1, further comprising:
transmitting, to the serving cell, the capability information including information related to the number of receiving beams.

9. A wireless communication device configured to perform measurement, the wireless communication device comprising:
at least one transceiver;
at least one processor; and
at least one computer memory operably connected to the at least one processor and storing instructions that, based on being executed by the at least one processor, perform operations comprising:
receiving, via the at least one transceiver from a serving cell, a Channel-State Information Reference Signal (CSI-RS) resource; and
performing measurement based on the CSI-RS resource during a measurement period,
wherein the measurement period is determined based on a repetition of the CSI-RS resource, and
based on that the repetition of the CSI-RS resource is set to ON, wherein the measurement period is based on a value related to a number of receiving beams, which is indicated by a capability information transmitted to the serving cell.

10. The wireless communication device of claim 9, the operations further comprising:
receiving, via the at least one transceiver, an SS (Synchronization Signal)/PBCH (Physical Broadcast Channel) Block (SSB) from the serving cell; and
performing radio link monitoring (RLM) measurement, based on an RLM-reference signal (RLM-RS) included in the SSB, during an evaluation period which is based on scaling factor 8.

11. The wireless communication device of claim 10, the operations further comprising:
determining a predetermined number of best beams by measuring RSRP (reference signal received power) for the CSI-RS resource through a beam sweeping operation based on a plurality of receiving beams,
wherein based on the SSB being Quasi-Co-Located (QCL) with the CSI-RS resource, the RLM measurement is performed based on the predetermined number of best beams during the evaluation period.

12. The wireless communication device of claim 9, the operations further comprising:
receiving, from the serving cell, information that the SSB is QCL with the CSI-RS resource.

13. The wireless communication device of claim 10, the operations further comprising:
based on the SSB not being QCL with the CSI-RS resource:
  determining the number of receiving beams to be used for the RLM measurement by performing a beam sweeping operation based on a plurality of beams on the SSB,
  wherein the RLM measurement is performed, based on the determined number of receiving beams.

14. The wireless communication device of claim 10, wherein the CSI-RS resource is repeatedly received from the serving cell, and
wherein the operations further comprise:
based on the SSB not being QCL with the CSI-RS resource:
  determining the number of receiving beams to be used for the RLM measurement by performing a receiving beam sweeping operation based on a plurality of receiving beams on the CSI-RS resource during a period in which the CSI-RS resource is repeatedly received,
  wherein the RLM measurement is performed, based on the determined number of receiving beams.

15. The wireless communication device of claim 9, wherein the CSI-RS resource is repeatedly received before a period in which the SSB is transmitted.

16. The wireless communication device of claim 9, the operations further comprising:
transmitting, to the serving cell, the capability information including information related to the number of receiving beams.

* * * * *